United States Patent
Gong et al.

(10) Patent No.: US 8,325,721 B2
(45) Date of Patent: Dec. 4, 2012

(54) METHOD FOR SELECTING HASH FUNCTION, METHOD FOR STORING AND SEARCHING ROUTING TABLE AND DEVICES THEREOF

(75) Inventors: Jun Gong, Shenzhen (CN); Chong Zhan, Shenzhen (CN); Hongfei Chen, Shenzhen (CN); Rui Hu, Shenzhen (CN); Jian Zhang, Shenzhen (CN); Hunghsiang Jonathan Chao, Holmdel, NJ (US); Hao Su, Shenzhen (CN); Xiaozhong Wang, Shenzhen (CN); Tuanhui Sun, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 725 days.

(21) Appl. No.: 12/511,558

(22) Filed: Jul. 29, 2009

(65) Prior Publication Data
US 2010/0058027 A1   Mar. 4, 2010

(30) Foreign Application Priority Data
Sep. 1, 2008   (CN) .......................... 2008 1 0213963

(51) Int. Cl.
*H04L 12/28* (2006.01)
*H04L 12/56* (2006.01)
(52) U.S. Cl. ..................................................... 370/389
(58) Field of Classification Search .................. 370/389, 370/392
See application file for complete search history.

(56) References Cited

U.S. PATENT DOCUMENTS

| | | | |
|---|---|---|---|
| 5,032,987 A | 7/1991 | Broder et al. | |
| 5,414,704 A | 5/1995 | Spinney | |
| 5,920,900 A | 7/1999 | Poole et al. | |
| 6,119,171 A * | 9/2000 | Alkhatib | 709/245 |
| 7,116,662 B2 * | 10/2006 | Juong | 370/392 |
| 7,251,707 B1 * | 7/2007 | Pereira | 711/108 |
| 7,526,603 B1 * | 4/2009 | Abdollahi-Alibeik et al. | 711/108 |

FOREIGN PATENT DOCUMENTS

| | | |
|---|---|---|
| EP | 0594196 A1 | 4/1994 |
| WO | 98/29986 A1 | 7/1998 |

OTHER PUBLICATIONS

European Search Report, EP 09 16 7458, Oct. 15, 2009.

* cited by examiner

*Primary Examiner* — Phirin Sam
*Assistant Examiner* — Blanche Wong
(74) *Attorney, Agent, or Firm* — Brinks Hofer Gilson & Lione

(57) ABSTRACT

A method for selecting a hash function, a method for storing and searching a routing table and devices thereof are provided. The method for selecting a hash function includes: hashing data to be hashed by using a current alternative hash function; decoding a hash result; accumulating decoded results until no carry occurs during the accumulation; and selecting a current alternative hash function with no carry generated as a formal hash function. The method for storing a routing table includes: dividing the routing table into a next-level node pointer portion and a prefix portion for being stored; and selecting a hash function by using the above method for selecting a hash function. The method for searching a routing table includes: directly searching an IP address to be searched according to a directly stored length of a next-level node pointer portion for storing the routing table; and reading a prefix node according to a searched result. Thus, hash collision can be avoided, and memory resources occupied by the routing table can be effectively reduced.

16 Claims, 6 Drawing Sheets

METHOD FOR SELECTING HASH FUNCTION, METHOD FOR STORING AND SEARCHING ROUTING TABLE AND DEVICES THEREOF

CROSS-REFERENCE TO RELATED APPLICATIONS

This application claims priority to Chinese Patent Application No. 200810213963.4, filed on Sep. 1, 2008, which is incorporated herein by reference in its entirety.

FIELD OF THE INVENTION

The disclosure relates to the field of communication technology, and more particularly to a method for selecting a hash function, a method for storing and searching a routing table and devices thereof.

BACKGROUND

In order to route from one address to another in an interconnecting network with numerous users, data related to various transmission paths is generally stored together to form a routing table, which is queried during routing.

Classless inter-domain routing (CIDR) is a commonly used routing table structure. When a routing table with the CIDR structure is used, an Internet protocol (IP) network is represented by a prefix, which is generally formed by an IP address of the IP network and a mask indicating the significant bits of the IP address. For example, "111*" indicates an IP address of "111" with three significant bits. The routing table is generally stored in a form of a Multi-Bit Tire. Routing table items of $2^n$ (n is an integer) sub-networks adjacent to each other in the address space and sharing the same route are combined into one path, and stored in the routing table as one entry, so that the routing table is searched according to the path.

Here, the storage method is described by way of citing an example. It is assumed that there are nine prefixes, namely, "P1", "P2", "P3", "P4", "P5", "P6", "P7", "P8", and "P9", and the relations between prefix labels and prefix values are as shown in Table 1.

TABLE 1

Relation between Prefix Labels and Prefix Values

| Prefix Label | Prefix Value |
|---|---|
| P1 | * |
| P2 | 1* |
| P3 | 00* |
| P4 | 101* |
| P5 | 111* |
| P6 | 1000* |
| P7 | 11101* |
| P8 | 111001* |
| P9 | 1000011* |

A basic binary tree search is performed at a rate of checking one bit in each step. If a corresponding maximum address prefix is M, the depth of the tree is M. If K bits are checked each time, the depth of the tree can be reduced to M/K, and accordingly, the number of matching entries contained in each internal node of the tree is increased to $2^K$. Such a tree is called a $2^K$ branched tree, which has a maximum layer number of M/K. The number of bits checked by the table searched algorithm at each node is K, which is also referred to as a step length of the tree.

If the step length of the Multi-Bit Tire is 3, each node in the tree contains $2^3$, i.e. 8, entries, and the structure thereof is as shown in Table 2.

TABLE 2

Node Structure with Step Length of 3

| | Matching Entry | Next-level Node Pointer |
|---|---|---|
| 000 | — | — |
| 001 | — | — |
| 010 | — | — |
| 011 | — | — |
| 100 | — | — |
| 101 | — | — |
| 110 | — | — |
| 111 | — | — |

A prefix matching entry refers to a prefix that matches with the entry. For example, "P1" corresponds to a value of "*", indicating that "P1" can match with any entry; and if the node is a root node, and an initial record is null, "000" to "111" are all matching entries of "P1". "P2" corresponds to a value of "1*", indicating that an IP address of "P2" is "1" with one significant bit, so that any entry starting with "1" can match with "P2"; and if the node is a root node, "100" to "111" are all matching entries of "P2". At this time, if "P1"has been stored, "100" to "111" are overwritten by "P2" when "P2" is stored. The storage methods for other prefixes with no more than three significant bits, namely, "P3", "P4", and "P5", may be deduced similarly. Particularly, "000" and "001" are matching entries of "P3"; "101" is a matching entry of "P4"; and "111" is a matching entry of "P5". A node structure with "P1", "P2", "P3", "P4", and "P5" being stored is as shown in Table 3.

TABLE 3

Node Structure with "P1", "P2", "P3", "P4", and "P5" Being Stored

| | Matching Entry | Next-level Node Pointer |
|---|---|---|
| 000 | P3 | — |
| 001 | P3 | — |
| 010 | P1 | — |
| 011 | P1 | — |
| 100 | P2 | — |
| 101 | P4 | — |
| 110 | P2 | — |
| 111 | P5 | — |

In the column of "Next-level Node Pointer (Ptr)" in Tables 2 and 3, each pointer pointing to a next-level node is stored. That is because a next-level node needs to be established when the significant bits of a prefix exceed the step length of the node. According to such a pointer, the next-level node may be found during query.

Taking "P6", "P7", "P8", and "P9" as examples, "P6" corresponds to a value of "1000*", indicating that "P6" has four significant bits and no matching entry can be found in the root node with the step length of 3. Therefore, a next-level node needs to be established when "P6" is stored. As "100" in the root node matches with the first three bits of "P6", a newly established next-level node pointer is stored in the column of "Next-level Node Pointer" corresponding to "100". In the newly established next-level node, all entries starting with "0" can match with "P6". A node structure with "P6" being stored is as shown in Table 4.

TABLE 4

Node Structure with "P6" Being Stored

| | Matching Entry | Next-level Node Pointer |
|---|---|---|
| 000 | P6 | — |
| 001 | P6 | — |
| 010 | P6 | — |
| 011 | P6 | — |
| 100 | — | — |
| 101 | — | — |
| 110 | — | — |
| 111 | — | — |

As "P7" corresponds to a value of "11101*" and "P8" corresponds to a value of "111001*", the first three bits thereof are the same, i.e. "111". Therefore, a next-level node may be established for "P7" and "P8". Particularly, a newly established next-level node pointer is stored in the column of "Next-level Node Pointer" corresponding to the root node of "111". Thus, in the newly established next-level node, "010" and "011" starting with "01" both match with "P7", and "001" matches with "P8". A node structure with "P7" and "P8" being stored is as shown in Table 5.

TABLE 5

Node Structure with "P7" and "P8" Being Stored

| | Matching Entry | Next-level Node Pointer |
|---|---|---|
| 000 | — | — |
| 001 | P8 | — |
| 010 | P7 | — |
| 011 | P7 | — |
| 100 | — | — |
| 101 | — | — |
| 110 | — | — |
| 111 | — | — |

As "P9" corresponds to a value of "1000011*" with seven significant bits, which are over twice as much as the step length "3" of the node, a further new level node needs to be established based on the next-level node of the root node. During the establishment process, it is determined whether the existing nodes have an entry that matches with the first six bits of "P9" or not. If yes, a newly established node pointer is filled into the column of "Next-level Node Pointer" corresponding to this entry; otherwise, a newly established node pointer is filled into the column of "Next-level Node Pointer" corresponding to an entry in the root node that matches with the first three bits of "P9". In this example, the node "001" as shown in Table 4 with "P6" already being stored matches with the first six bits of "P9", so that a newly established node pointer is filled into the column of "Next-level Node Pointer" corresponding to this entry, and any newly established entry starting with "1" matches with "P9". A node structure with "P9" being stored is as shown in Table 6.

TABLE 6

Node Structure with "P9" Being Stored

| | Matching Entry | Next-level Node Pointer |
|---|---|---|
| 000 | — | — |
| 001 | — | — |
| 010 | — | — |
| 011 | — | — |
| 100 | P9 | — |
| 101 | P9 | — |

TABLE 6-continued

Node Structure with "P9" Being Stored

| | Matching Entry | Next-level Node Pointer |
|---|---|---|
| 110 | P9 | — |
| 111 | P9 | — |

"P1", "P2", "P3", "P4", "P5", "P6", "P7", "P8", and "P9" are all stored in the Multi-Bit Tire with the step length of 3. FIG. 1 shows a complete structure of the Multi-Bit Tire.

The Multi-Bit Tire includes a root node equivalent to the nodes shown in Table 3, a node 1 equivalent to the nodes shown in Table 4, a node 2 equivalent to the nodes shown in Table 5, and a node 3 equivalent to the nodes shown in Table 6.

During the research and implementation process of the related art, the inventor(s) found that the prior art has the following problem.

Each node needs to apply for a fixed-size storage space, but most entries of the nodes do not have a corresponding next-level node, that is, most of the Ptr entries are null. For example, in FIG. 1, totally 29 Ptr entries are null, which wastes a lot of memory resources. In most cases, the memory resources are very limited. In practice, as a routing table may have up to hundreds or thousands of nodes or even more, more memory resources may be wasted.

SUMMARY

Accordingly, various embodiments of the disclosure are directed to a method for selecting a hash function, a method for storing and searching a routing table and devices thereof, so as to reduce the memory resources occupied by the routing table.

In order to solve the above technical problem, one embodiment of the disclosure provides a method for selecting a hash function in an embodiment. The method includes the following steps.

Data to be hashed is input. The data to be hashed is hashed by using a current alternative hash function. A hash result is decoded. Decoded results are accumulated. If a carry occurs during the accumulation, replace the current alternative hash function with a next alternative hash function to hash the data to be hashed until no carry occurs during the accumulation, and a current alternative hash function with no carry is selected as a formal hash function.

One embodiment of the disclosure provides a device for selecting a hash function. The device includes an alternative hash function unit, a hash unit, a decoder, and an accumulator.

The alternative hash function unit is configured to send a current alternative hash function.

The hash unit is configured to receive input data to be hashed, and hash the data to be hashed by using the current alternative hash function sent by the alternative hash function unit.

The decoder is configured to decode a hash result of the hash unit.

The accumulator is configured to accumulate decoded results of the decoder, and instruct the alternative hash function unit to replace the current alternative hash function with a next alternative hash function if a carry occurs or instruct the alternative hash function unit to select the current alternative hash function with no carry generated as a formal hash function if no carry occurs.

One embodiment of the disclosure provides a method for storing a routing table. The method includes the following steps.

The routing table is divided into a next-level node pointer portion and a matching entry portion for being stored.

Root node data and first-level node data are stored at the next-level node pointer portion.

The root node data includes a root node matching entry with a next-level node pointer, a root node hash function of the matching entry, a next-level node pointer of a root node, and a matching entry pointer of the root node. The root node hash function is a formal hash function selected by using the method for selecting a hash function according to claim 1. The matching entry pointer of the root node points to the matching entry portion.

An Internet protocol (IP) address in a step length range of a first-level node of the matching entry is hashed by using the root node hash function of the matching entry, and the first-level node data at a position pointed to by the next-level node pointer of the root node is stored by using a hash result as an offset address.

The first-level node data includes the IP address in the step length range of the first-level node of the matching entry, a hash function of the first-level node of the matching entry, a next-level node pointer of the first-level node, and a matching entry pointer of the first-level node. The hash function of the first-level node is a formal hash function selected by using the method for selecting a hash function according to claim 1.

The matching entry pointer of the first-level node points to the matching entry portion.

One embodiment of the disclosure provides a method for storing a routing table. The method includes the following steps.

The routing table is divided into a next-level node pointer portion and a matching entry portion for being stored.

Root node data and first-level node data are stored at the next-level node pointer portion.

The root node data includes a root node matching entry with a next-level node pointer, a hash function of a root node segment of the matching entry, a next-level node pointer of the root node segment, and a matching entry pointer of a root node. The root node segment is a segment formed by dividing a next-level node of the root node matching entry into more than two segments. The hash function of the root node segment is a formal hash function selected for an IP address in a step length range of a first-level node in the root node segment of the matching entry by using the method for selecting a hash function according to claim 1. The matching entry pointer of the root node points to the matching entry portion.

The IP address in the step length range of the first-level node in the root node segment of the matching entry is hashed by using the hash function of the root node segment of the matching entry, and the first-level node data of the root node segment at a position pointed to by a next-level node pointer of the root node is stored by using a hash result as an offset address.

The first-level node data includes the IP address in the step length range of the first-level node of the matching entry, a hash function of a first-level node segment of the matching entry, a next-level node pointer of the first-level node segment, and a matching entry pointer of the first-level node. The first-level node segment is a segment formed by dividing a next-level node of the first-level node of the matching entry into more than two segments. The hash function of the first-level node segment is a formal hash function selected for an IP address in a step length range of a second-level node in the root node segment of the matching entry by using the method for selecting a hash function according to claim 1.

The matching entry pointer of the first-level node points to the matching entry portion.

One embodiment of the disclosure provides a method for searching a routing table. The method includes the following steps.

An IP address to be searched is directly searched according to a directly stored length of a next-level node pointer portion for storing a routing table.

The searched root node data is read.

When a next-level node pointer exists in the root node data, an IP address in a step length range of a next-level node is hashed by using a root node hash function in the acquired root node data, and the next-level node data is searched by using the next-level node pointer and a hash result as an offset.

A matching entry is read according to a searched result.

The disclosure further provides a method for searching a routing table. The method includes the following steps.

An IP address to be searched is directly searched according to a directly stored length of a next-level node pointer portion for storing a routing table.

The searched root node data is read.

The searched root node data is searched according to a segment label of the IP address to be searched so as to acquire root node segment data corresponding to the segment label.

When a next-level node pointer exists in the root node segment data, a valid IP address in a step length range of a next-level node is hashed by using a hash function in the root node segment data, and the next-level node data is searched by using the next-level node pointer and a hash result as an offset.

A matching entry is read according to a searched result.

One embodiment of the disclosure provides a device for storing a routing table. The device includes a first matching entry unit and a first next-level node pointer unit.

The first matching entry unit is configured to store a matching entry portion of the routing table.

The first next-level node pointer unit is configured to store root node data and first-level node data.

The root node data includes a root node matching entry with a next-level node pointer, a root node hash function of the matching entry, a next-level node pointer of a root node, and a matching entry pointer of the root node. The root node hash function is a formal hash function selected by using the method for selecting a hash function according to claim 1. The matching entry pointer of the root node points to the matching entry portion.

An IP address in a step length range of a first-level node of the matching entry is hashed by using the root node hash function of the matching entry, and a hash result is taken as an offset address to store the first-level node data at a position pointed to by the next-level node pointer of the root node.

The first-level node data includes the IP address in the step length range of the first-level node of the matching entry, a hash function of the first-level node of the matching entry, a next-level node pointer of the first-level node, and a matching entry pointer of the first-level node. The hash function of the first-level node is a formal hash function selected by using the method for selecting a hash function according to claim 1.

The matching entry pointer of the first-level node points to the matching entry portion.

One embodiment of the disclosure provides a device for storing a routing table. The device includes a second matching entry unit and a second next-level node pointer unit.

The second matching entry unit is configured to store a matching entry portion of the routing table.

The second next-level node pointer unit is configured to store root node data and first-level node data.

The root node data includes a root node matching entry with a next-level node pointer, a hash function of a root node segment of the matching entry, a next-level node pointer of the root node segment, and a matching entry pointer of a root node. The root node segment is a segment formed by dividing a next-level node of the root node matching entry into more than two segments. The hash function of the root node segment is a formal hash function selected for an IP address in a step length range of a first-level node in the root node segment of the matching entry by using the method for selecting a hash function according to claim 1. The matching entry pointer of the root node points to the matching entry portion.

The IP address in the step length range of the first-level node in the root node segment of the matching entry is hashed by using the hash function of the root node segment of the matching entry, and the first-level node data of the root node segment at a position pointed to by a next-level node pointer of the root node is stored by using a hash result as an offset address.

The first-level node data includes the IP address in the step length range of the first-level node of the matching entry, a hash function of a first-level node segment of the matching entry, a next-level node pointer of the first-level node segment, and a matching entry pointer of the first-level node. The first-level node segment is a segment formed by dividing a next-level node of the first-level node of the matching entry into more than two segments. The hash function of the first-level node segment is a formal hash function selected for an IP address in a step length range of a second-level node in the root node segment of the matching entry by using the method for selecting a hash function according to claim 1.

The matching entry pointer of the first-level node points to the matching entry portion.

One embodiment of the disclosure provides a device for searching a routing table. The device includes a first direct searched unit, a first reading unit, a first hash searched unit, and a second reading unit.

The first direct searched unit is configured to directly search an IP address to be searched according to a directly stored length of a next-level node pointer portion for storing the routing table.

The first reading unit is configured to read root node data acquired by the first direct searched unit.

The first hash searched unit is configured to hash an IP address to be searched in a step length range of a next-level node by using a root node hash function in the root node data read by the first reading unit if a next-level node pointer exists in the root node data, and search next-level node data by using the next-level node pointer and a hash result as an offset.

The second reading unit is configured to read a matching entry according to a searched result about the next-level node data acquired by the first hash searched unit.

The disclosure further provides a device for searching a routing table. The device includes a second direct searched unit, a segment data acquisition unit, a fourth hash searched unit, and a third reading unit.

The second direct searched unit is configured to directly search an IP address to be searched according to a directly stored length of a next-level node pointer portion for storing the routing table.

The segment data acquisition unit is configured to read root node data acquired by the second direct searched unit; and search the searched root node data according to a segment label of the IP address to be searched so as to acquire root node segment data corresponding to the segment label.

The fourth hash searched unit is configured to hash a valid IP address in a step length range of a next-level node by using a hash function in the root node segment data acquired by the segment data acquisition unit when a next-level node pointer exists in the root node segment data, and search next-level node data by using the next-level node pointer and a hash result as an offset.

The third reading unit is configured to read a matching entry according to a searched result about the next-level node data acquired by the fourth hash searched unit.

As seen from the above technical solution, in the disclosure, alternative hash functions are filtered, an alternative hash function is used to hash data to be hashed, and a hash result is decoded. If identical hash results exist, the data obtained after decoding must be the same, so that a carry definitely occurs when the decoded results are accumulated. Therefore, if a carry occurs when the decoded results are accumulated, it is determined that a collision may occur when the alternative hash function is used for hashing; and if no carry occurs when the decoded results are accumulated, it is determined that no collision may occur when the alternative hash function is used for hashing, and the current hash function may be used for subsequent operations. Thus, a hash collision can be avoided. By selecting a hash function and performing hashing when the routing table is stored according to the technical solution of the disclosure, the space occupied by the routing table can be effectively reduced.

DETAILED DESCRIPTION

Figure 1:
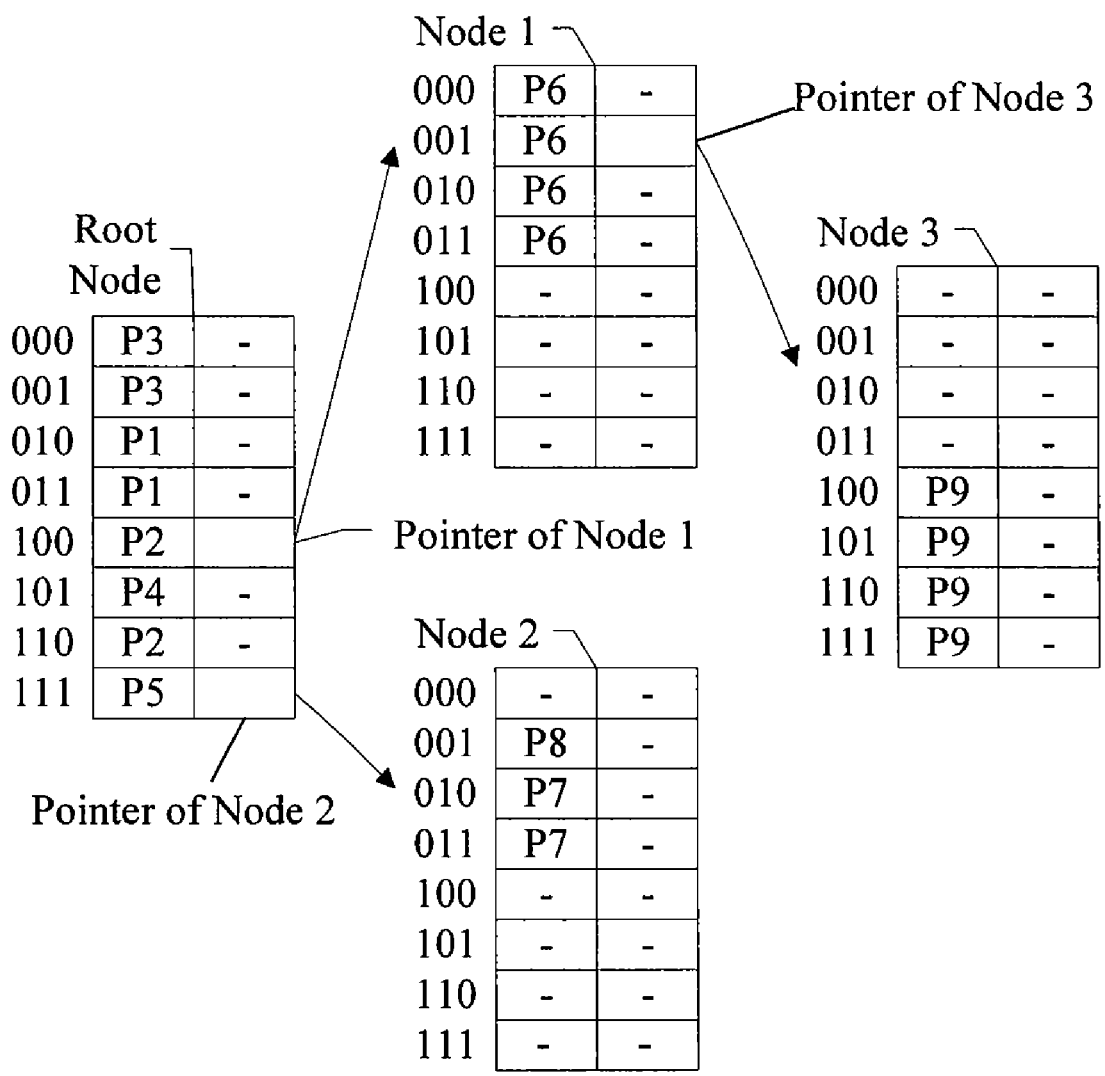
FIG. 1 is a schematic view of a Multi-Bit Tire in the related art.

The technical solution of the disclosure is clearly and fully described below with reference to the accompanying drawings. Obviously, the embodiments described below are only a part of the embodiments rather than all the embodiments of the disclosure. All the other embodiments derived by those skilled in the art based on the embodiments of the disclosure without creative labor should fall within the scope of the disclosure.

Currently, more and more systems need to quickly search required information from a large amount of data information, for example, a core router that needs to search various forwarding tables in the field of data communication. Currently, fixed-length information is generally searched by a hash-based method.

The hash-based searched method mainly includes mapping a long key to a short space for storage according to certain mapping relation. Such mapping relation is a hash function. For example, a 32-bit Internet protocol (IP) address is mapped to a 20-bit address space by using a hash function. When certain information is added, a key of the information is hashed, i.e. f(key)=h, in which f( ) indicates a particular hash function, key indicates a keyword of the information to be stored, and h indicates a hash address for storing the information. The address is corresponding to an $h^{th}$ storage unit of the storage space, and both the key value and attached information corresponding to the key value are stored at the address. As such, during the look-up motion, the corresponding attached information may be obtained by simply acquiring the corresponding hash address through hashing the key value. However, when two key values are hashed and the same hash value is obtained, i.e. f(key1)=f(key2), the two information may need to be stored at the same address. As a result, a collision occurs, and the information corresponding to the two key values become collision entries, thereby causing difficulties on storing and searching the information.

In order to avoid the collision, a first embodiment of a method for selecting a hash function according to the disclosure includes the following steps: inputting data to be hashed; hashing the data to be hashed by using a current alternative hash function; decoding a hash result; accumulating decoded results; if a carry occurs, replacing the current alternative hash function by using a next alternative hash function to hash the data to be hashed until no carry occurs during the accumulation, and selecting a current alternative hash function with no carry as a formal hash function.

In the first embodiment of the method for selecting a hash function according to the disclosure, alternative hash functions are filtered, an alternative hash function is used to hash the data to be hashed, and then a hash result is decoded. If identical hash results exist, a carry definitely occurs when the decoded results are accumulated. Therefore, if a carry occurs when the decoded results are accumulated, it is determined that a collision will occur when the current alternative hash function is used for hashing; and if no carry occurs when the decoded results are accumulated, it is determined that no collision will occur when the current alternative hash function is used for hashing, and the current hash function may be used for subsequent operations. Thus, a collision can be avoided through the first embodiment of the method for selecting a hash function according to the disclosure.

For example, two data to be hashed are provided, namely, Data 1=0x1100, and Data 2=0x0010. A first alternative hash function is "0x0001". An AND operation is performed on Data 1 and Data 2 by using "0x0001", and the results are both "0". Then, "0" is 3-bit to 8-bit decoded, i.e. ⅜ translated, and the results are both "00000001". A carry definitely occurs when the results are accumulated, so it is determined that a collision will occur when "0x0001" is used as a hash function. Then, a next alternative hash function is used for hashing. Assuming the next alternative hash function is "0x0010", the acquired results are respectively "0" and "1". Then, "0" and "1" are 3-bit to 8-bit decoded, and the results are respectively "00000001" and "00000010". As "1" is located at different bit positions in the above results, no carry occurs when the results are accumulated. In this case, it is determined that no collision will occur when "0x0010" is used as a hash function, and "0x0010" may be selected as a formal hash function for subsequent operations. In this example, the data to be hashed has a step length of 4 bits, so the significant bit length of the hash function to be selected may be 1 bit to 3 bits, and the decoding mode may be 3-bit to 8-bit decoding, or may be 4-bit to 16-bit decoding. However, the disclosure is not limited to the above example.

Figure 2:
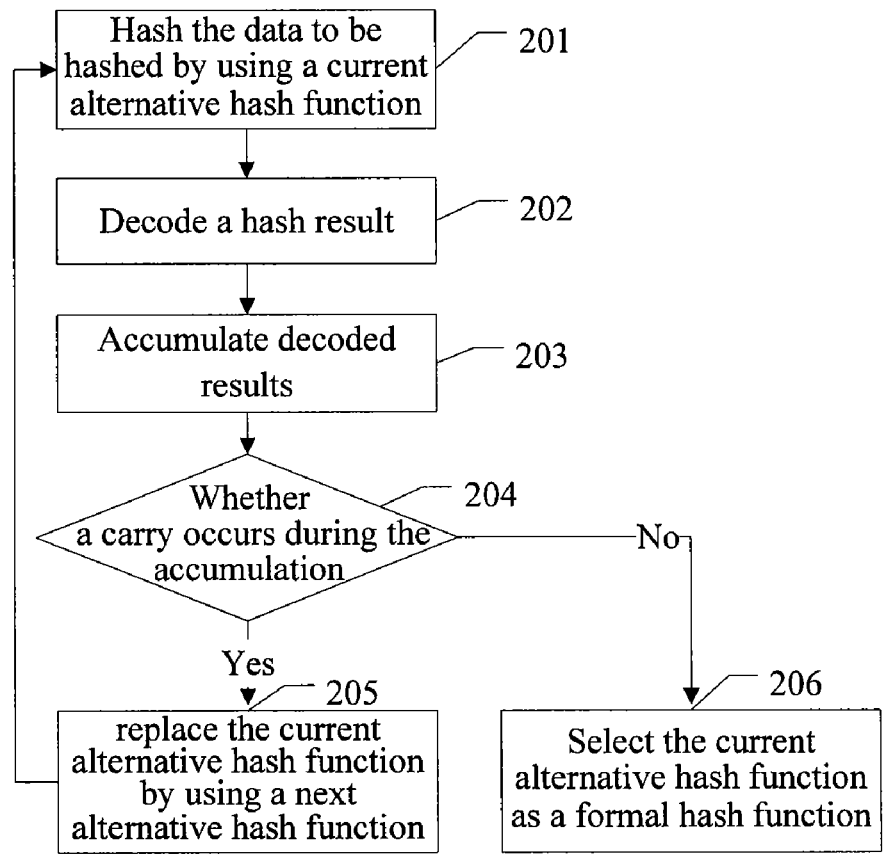
FIG. 2 is a flow chart of a second embodiment of a method for selecting a hash function according to one embedment of the disclosure.

FIG. 2 is a flow chart of a second embodiment of a method for selecting a hash function according to the disclosure.

In step 201, data to be hashed is input, and the data to be hashed is hashed by using a current alternative hash function.

In practice, the data to be hashed may be successively input in series via the same input line and then successively hashed by using the alternative hash function. Alternatively, the data to be hashed may be input in parallel via a plurality of input lines and then concurrently hashed by using the alternative hash function. However, in order to accelerate the operation, the parallel mode is generally used to input the data to be hashed. If a large amount of data to be hashed is provided, a serial-parallel mode may be used to input the data. That is, the data to be hashed is input in series via a plurality of input lines respectively. For example, there are 40 data to be hashed and only 10 input lines, so that the 40 data to be hashed are classified into 10 groups, and each group having 4 data to be hashed. Thus, 4 data are input via each line, and the input operations via the lines are concurrently performed in parallel.

In step 202, a hash result is decoded, and only one bit in each decoded result is "1".

A data length of the hash result is generally smaller than the step length of the data to be hashed. For example, as for the data to be hashed having a step length of 6, the data length after hashing is generally smaller than or equal to "5", so that 5-bit to 32-bit decoding may be generally used.

In step 203, the decoded results are accumulated.

In step 204, it is determined whether a carry occurs or not during the accumulation, and if yes, step 205 is performed; otherwise, step 206 is performed.

In step 205, a next alternative hash function is used to replace the current alternative hash function, and step 201 is performed.

If a carry occurs during the accumulation, it is indicated that identical hash results exist, so that a collision will occur when the current alternative hash function is used for hashing, and thus, a next alternative hash function needs to be used to replace the current alternative hash function to repeat the above process.

The number of alternative hash functions may be determined according to the actual conditions. For example, if the step length of the data to be hashed is 4, and when a hash function is used for hashing, bit positions that are "1" in the hash function are taken as significant bits for filtering the data to be hashed. Thus, if the hash function is "0x1010", the $2^{nd}$ and $4^{th}$ bits of the data to be hashed are selected as significant bits. In this case, the alternative hash function may be selected from "0x0001" to "0x1110", which is merely one example among various hashing methods in practical use.

The alternative hash functions may be filtered randomly, and may also be filtered in a descending order of the number of significant bits, or in an ascending order of the number of significant bits. Preferably, the alternative hash functions are filtered in an ascending order of the number of significant bits. That is because the smaller the number of significant bits is, the shorter the data obtained after hashing will be, and thus, when entries are stored by a hash searched table, the searched efficiency is improved, and the space occupied by the entries is reduced.

In step 206, the current alternative hash function is selected as a formal hash function.

If no carry occurs during the accumulation, it is indicated that no identical hash results exist, so that no collision will occur when the current alternative hash function is used to hash the data to be hashed, and thus, the current alternative hash function may be selected as a formal hash function for subsequent operations.

In the second embodiment of the method for selecting a hash function according to the disclosure, alternative hash functions are filtered, an alternative hash function is used to hash the data to be hashed, and a hash result is decoded. Only one bit in each decoded result is "1", and "1" is located at different bit positions for different hash results after decoding. If identical hash results exist, "1" in the data obtained after decoding is located at the same bit position, and a carry definitely occurs when the decoded results are accumulated. Therefore, if a carry occurs when the decoded results are accumulated, it is determined that a collision will occur when the current alternative hash function is used for hashing; and if no carry occurs when the decoded results are accumulated, it is determined that no collision will occur when the current alternative hash function is used for hashing, and the hash function may be selected for subsequent operations. Thus, a collision can be avoided by using the second embodiment of the method for selecting a hash function according to the disclosure.

Figure 3:
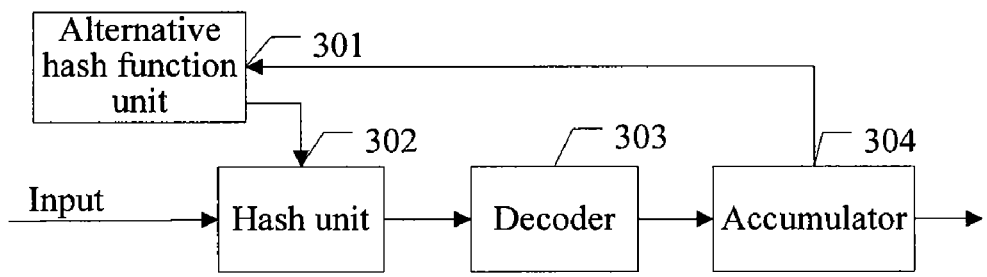
FIG. 3 is a structural view of a first embodiment of a device for selecting a hash function according to one embedment of the disclosure.

FIG. 3 is a structural view of a first embodiment of a device for selecting a hash function according to the disclosure. The device for selecting a hash function includes an alternative hash function unit 301, a hash unit 302, a decoder 303, and an accumulator 304.

The alternative hash function unit 301 is configured to send a current alternative hash function to the hash unit 302.

The hash unit 302 is configured to receive data to be hashed input via an input port, and hash the data to be hashed by using the current alternative hash function sent by the alternative hash function unit 301.

The decoder 303 is configured decode a hash result of the hash unit 302. Only one bit in each decoded result is "1".

The accumulator 304 is configured to accumulate the decoded results of the decoder 303, instruct the alternative hash function unit 301 to use a next alternative hash function to replace the current alternative hash function if a carry occurs, or instruct the alternative hash function unit 301 to select the current alternative hash function as a formal hash function if no carry occurs.

In the first embodiment of the device for selecting a hash function according to the disclosure, alternative hash functions may be filtered, a current alternative hash function is used to hash the data to be hashed, and a hash result is decoded. Only one bit in each decoded result is "1", and "1" is located at different bit positions for different hash results after decoding. If identical hash results exist, "1" in the data obtained after decoding is located at the same bit position, and a carry definitely occurs when the decoded results are accumulated. Therefore, if a carry occurs when the decoded results are accumulated, it is determined that a collision will occur when the current alternative hash function is used for hashing; and if no carry occurs when the decoded results are accumulated, it is determined that no collision will occur when the current alternative hash function is used for hashing, and the hash function may be selected for subsequent opera-tions. Thus, a collision can be avoided by using the first embodiment of the device for selecting a hash function according to the disclosure.

The first embodiment of the device for selecting a hash function according to the disclosure merely includes one input line, one hash unit, and one decoder. However, in practical use, the device may include a plurality of input lines, a plurality of hash units, and a plurality of decoders, so as to input data in parallel, and concurrently perform hashing, decoding, and other operations, thus improving the overall operating efficiency of the device.

Figure 4:
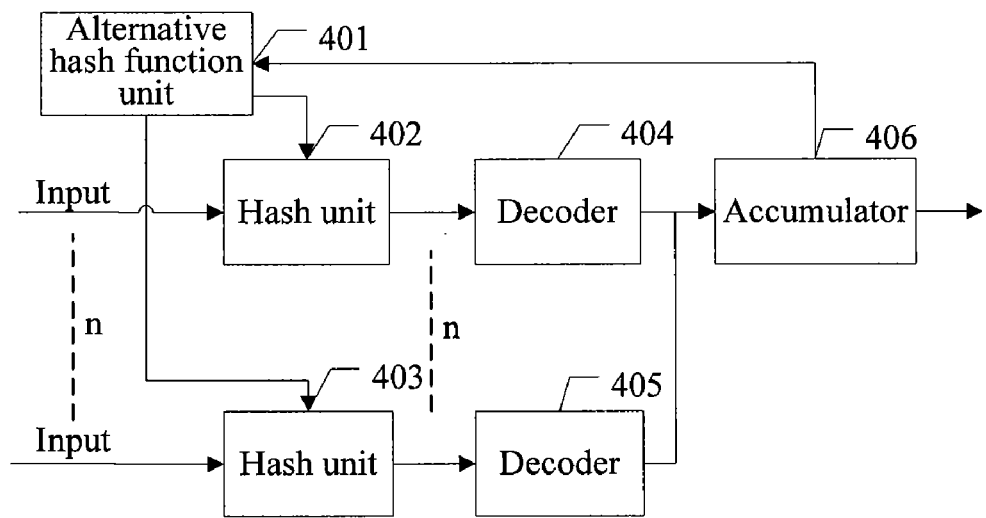
FIG. 4 is a structural view of a second embodiment of a device for selecting a hash function according to one embedment of the disclosure.

FIG. 4 is a structural view of a second embodiment of a device for selecting a hash function according to the disclosure. The second embodiment of the device for selecting a hash function is described by taking a device including two input lines, two hash units, and two decoders as an example. The device includes an alternative hash function unit 401, a hash unit 402, a hash unit 403, a decoder 404, a decoder 405, and an accumulator 406.

The alternative hash function unit 401 is configured to send a current alternative hash function to the hash unit 402.

The hash unit 402 is configured to receive data to be hashed input via an input port, and hash the data to be hashed by using the current alternative hash function sent by the alternative hash function unit 401.

The hash unit 403 is configured to receive data to be hashed input via an input port, and hash the data to be hashed by using the current alternative hash function sent by the alternative hash function unit 401.

The decoder 404 is configured to decode a hash result of the hash unit 402. Only one bit in each decoded result is "1".

The decoder 405 is configured to decode a hash result of the hash unit 403. Only one bit in each decoded result is "1".

The accumulator 406 is configured to accumulate the decoded results of the decoders 404 and 405, instruct the alternative hash function unit 401 to use a next alternative hash function to replace the current alternative hash function if a carry occurs, or instruct the alternative hash function unit 401 to select the current alternative hash function as a formal hash function if no carry occurs.

The two input lines, two hash units, and two decoders in this embodiment are merely described as an example. The device may include n input lines, n hash units, and n decoders according to the actual conditions, and n is an integer greater than or equal to 2.

As the second embodiment of the device for selecting a hash function according to the disclosure includes a plurality of input lines, a plurality of hash units, and a plurality of decoders, the data to be hashed may be input in parallel via different input lines, and may be concurrently hashed and decoded by the hash units and the decoders, thus improving the overall operating efficiency of the device.

In the second embodiment of the device for selecting a hash function according to the disclosure, alternative hash functions are filtered, a current alternative hash function is used to hash the data to be hashed, and a hash result is decoded. Only one bit in each decoded result is "1", and "1" is located at different bit positions for different hash results after decoding. If identical hash results exist, "1" in the data obtained after decoding is located at the same bit position, and a carry definitely occurs when the decoded results are accumulated. Therefore, if a carry occurs when the decoded results are accumulated, it is determined that a collision will occur when the current alternative hash function is used for hashing; and if no carry occurs when the decoded results are accumulated, it is determined that no collision will occur when the current alternative hash function is used for hashing, and the hash function may be selected for subsequent operations. Thus, a collision can be avoided by using the second embodiment of the device for selecting a hash function according to the disclosure.

The method for filtering data to be hashed by using a significant bit of a hash function is a commonly used hashing method. In this case, the hash unit in the first and second embodiments of the device for selecting a hash function according to the disclosure includes a router configured to filter the data to be hashed by using a significant bit of the current alternative hash function, and obtain a filtering result for decoding.

The above descriptions are embodiments of the method and device for selecting a hash function of the disclosure.

In an embodiment of a method for storing a routing table according to the disclosure, the routing table is divided into a Prefix portion and a Ptr portion for storage respectively.

Figure 5:
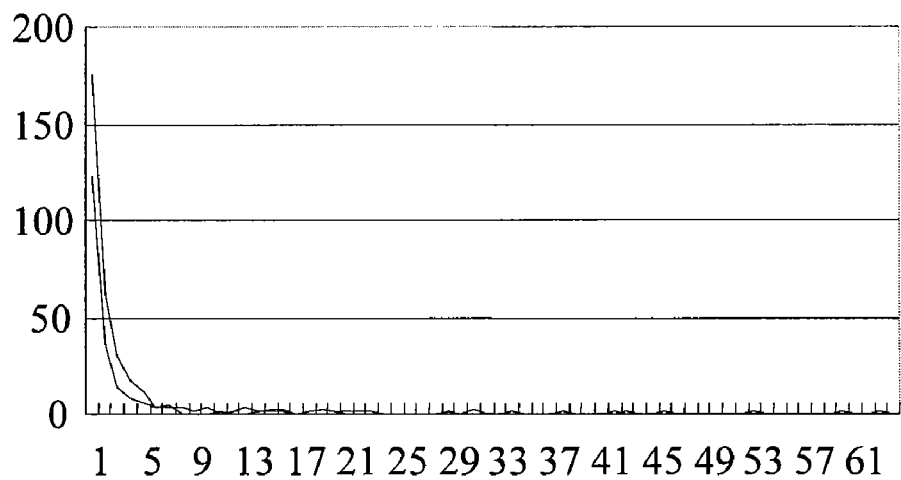
FIG. 5 shows a distribution diagram of the number of next-level nodes of nodes in two actual routing tables.

As found through studying a currently commonly used routing table, nodes that have a next-level node being a tree node merely take a small portion in the entire routing table, and the number of next-level nodes of such nodes is mostly no more than 64. Here, two actual routing tables are described. FIG. 5 shows a distribution diagram of the number of next-level nodes of nodes in two actual routing tables. The horizontal coordinate represents the number of next-level nodes of the nodes, and the vertical coordinate represents the number of the nodes. Two curves are respectively corresponding to the two actual routing tables, in which a step length is 8.

As seen from FIG. 5 that, most nodes only have one or two next-level nodes, and those nodes having more than five next-level nodes take merely a small portion. Based on this, a method for storing pointers by hashing is proposed in the embodiment of the method for storing a routing table according to the disclosure.

Matching entries close to the root node are more likely to have a next-level node pointer, so that the IP address of each matching entry close to the root node is not hashed according to actual conditions of the routing table in the embodiment of the method for storing a routing table according to the disclosure. Generally, matching entries of 0-8 bits or 0-16 bits are not hashed but directly stored, because in a commonly used routing table, matching entries of 0-8 bits or even 0-16 bits and next-level node pointer portions thereof do not occupy a large space. According to the actual conditions, matching entries of 0-3 bits or 0-4 bits may not be hashed as well. If a directly stored matching entry has a next-level node pointer and an IP address of a matching entry pointed to by the next-level node pointer needs to be hashed before being stored, the data stored in the directly stored matching entry should contain a hash function configured to hash the IP address of the matching entry pointed to by the next-level node pointer.

In order to avoid a hash collision, in this embodiment, the IP address to be stored is hashed by using a hash function selected by using the method for selecting a hash function of the disclosure.

Because matching entries distant from the root node are more likely to have no next-level node pointer, in the embodiment of the method for storing a routing table of the disclosure, an IP address of each matching entry distant from the root node is hashed according to actual conditions of the routing table, and then a hash value and a next-level node pointer thereof are stored. For example, if the matching entries of 0-8 bits or 0-16 bits are not hashed but directly stored, the IP address of the matching entry after 0-8 bits or 0-16 bits is hashed first and then stored. A data structure after the hash value is stored is as shown in Table 7.

TABLE 7

Data Structure after the Hash Value is Stored

| Hash Function | IP | Matching Entry Pointer |
|---|---|---|
| Next-level Node Pointer | | |

The entry "Hash Function" is configured to store a hash function selected by using the method for selecting a hash function according to the disclosure, i.e. a hash function configured to hash the IP address to be stored. The entry "IP" is configured to store an actual IP address on a corresponding step length, so as to avoid a searched error. For example, the hash function is "0x1000", and IP addresses to be stored are "0x1001" and "0x0010", and after being filtered according to a significant bit, hash results are respectively "1" and "0". If an IP address to be searched is "0x1000", a hash result thereof is also "1", so that the entry of "0x1001" is also found. At this time, the content of the corresponding entry "IP" is checked, so as to determine that a searched error occurs. According to the actual conditions, an IP address may be selected to be the actual length, for example, the IP address is selected to be 3 bits when the step length is 3 bits, or selected to be 8 bits when the step length is 8 bits. Alternatively, bit positions that are most significantly different from each other may also be selected and compared. When the hash function of "0x1000" is still taken as an example, actual IP addresses at $1^{st}$, $2^{nd}$, and $3^{rd}$ bit positions may be selected and compared, so as to reduce the size of the data structure.

Table 7 is merely an example, and the positions of different entries may be changed in practical use, for example, the entry "IP" is in the first position, followed by the entry "Next-level Node Pointer", the entry "Matching Entry Pointer", and the entry "Hash Function" in succession.

Figure 6:
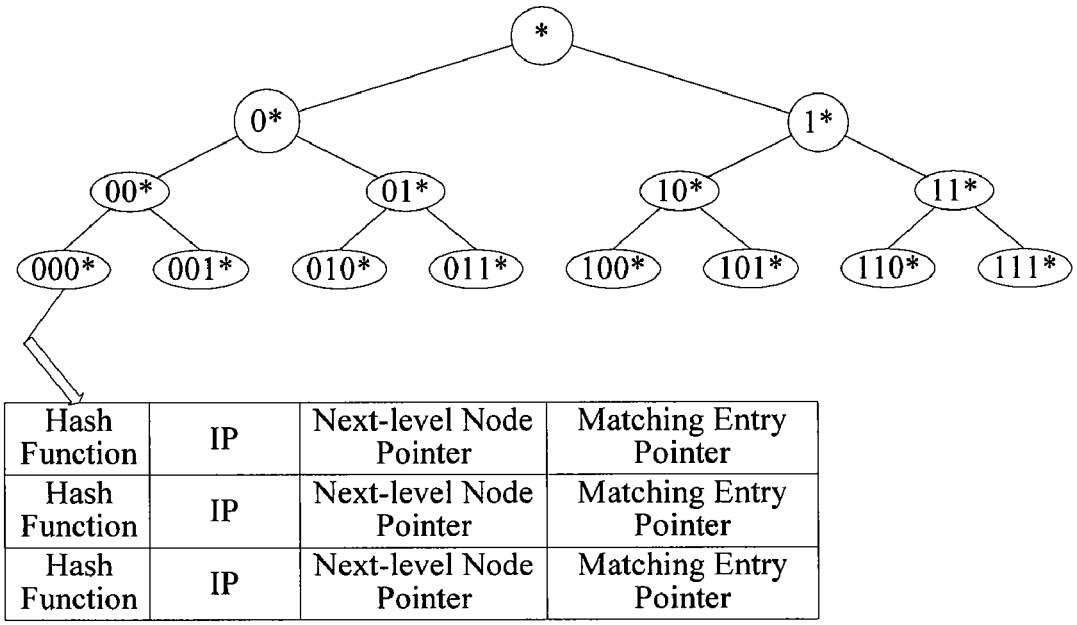
FIG. 6 shows a storage structure of an embodiment of a method for storing a routing table according to one embedment of the disclosure.

Matching entries of 0-3 bits that are directly stored are taken as an example, and storage structures thereof are as shown in FIG. 6.

If "*" begins from 0 bit, four levels of matching entries are directly stored. Among the last-level matching entries, only 000 has a next-level node, so that only a next-level node pointer of 000 points to a data structure that stores a hash value. The data structure contains "Hash Function", "IP", "Next-level Node Pointer", and "Matching Entry Pointer".

Figure 7:
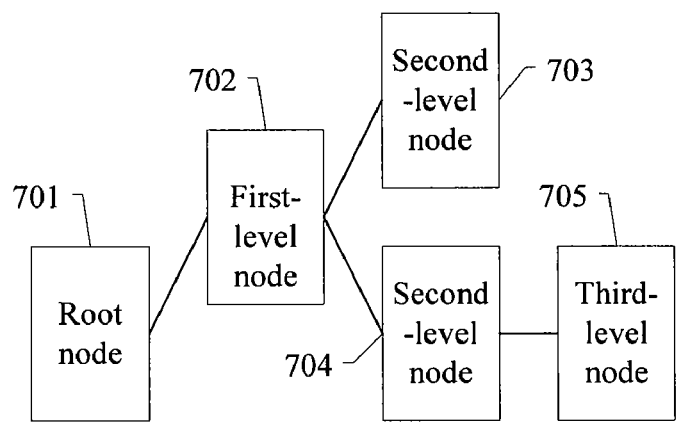
FIG. 7 shows a node structure of an embodiment of a method for storing a routing table according to one embedment of the disclosure.

A specific storage method is described by way of an example. It is assumed that a routing table to be stored has a length of 32 bits, and is stored in a mode of Multi-Bit Tire with a step length of 8 and four levels, and a node structure thereof is as shown in FIG. 7.

A root node 401 may store 28 matching entries, among which only one matching entry has a next-level node, and a next-level node pointer of the matching entry points to a first-level node 702. The first-level node 702 may also store 28 matching entries, among which two matching entries have a next-level node, and next-level node pointers of the two matching entries respectively point to a second-level node 703 and a second-level node 704. The second-level node 703 may also store 28 matching entries, but none of the matching entries has a next-level node. The second-level node 704 may also store 28 matching entries, among which only one matching entry has a next-level node, and a next-level node pointer of the matching entry points to a third-level node 705. The third-level node 705 may also store 28 matching entries, but none of the matching entries has a next-level node.

The first-level node 702, the second-level node 703, the second-level node 704, and the third-level node 705 have applied for and reserved the space for 28*4 matching entries in total, in which only three matching entries have a next-level node, i.e. only three entries of "Next-level Node Pointer" are not null, so that the space occupied by entries of "Next-level Node Pointer" for 28*4−3 matching entries is wasted. In addition, as not all positions have a corresponding matching entry, the space occupied by the entries of "Matching Entry" is also severely wasted.

A first embodiment of the method for storing a routing table according to the disclosure includes the following steps.

The routing table is divided into a next-level node pointer portion and a matching entry portion for being stored.

Root node data and first-level node data are stored at the next-level node pointer portion.

The root node data includes a root node matching entry with a next-level node pointer, a root node hash function of the matching entry, a next-level node pointer of a root node, and a matching entry pointer of the root node. The root node hash function is a formal hash function selected by using the method for selecting a hash function according to claim 1. The matching entry pointer of the root node points to the matching entry portion.

An IP address in a step length range of a first-level node of the matching entry is hashed by using the root node hash function of the matching entry, and a hash result is taken as an offset address to store the first-level node data at a position pointed to by the next-level node pointer of the root node.

The first-level node data includes the IP address in the step length range of the first-level node of the matching entry, a hash function of the first-level node of the matching entry, a next-level node pointer of the first-level node, and a matching entry pointer of the first-level node. The hash function of the first-level node is a formal hash function selected by using the method for selecting a hash function according to claim 1.

The matching entry pointer of the first-level node points to the matching entry portion.

When more levels of nodes exist and the number of levels is N, the method further includes the following steps.

First, $N^{th}$-level node data is stored at the next-level node pointer portion.

Then, an IP address in a step length range of an $N^{th}$-level node is hashed by using a hash function of an $(N-1)^{th}$-level node of the matching entry, and a hash result is taken as an offset address to store the $N^{th}$-level node data at a position pointed to by a next-level node pointer of the $(N-1)^{th}$-level node.

The $N^{th}$-level node data includes the IP address in the step length range of the $N^{th}$-level node of the matching entry, a hash function of the $N^{th}$-level node of the matching entry, a next-level node pointer of the $N^{th}$-level node, and a matching entry pointer of the $N^{th}$-level node. The hash function of the $N^{th}$-level node is a formal hash function selected by using the method for selecting a hash function according to claim 1.

The matching entry pointer of the $N^{th}$-level node points to the matching entry portion.

N is an integer greater than or equal to 2.

Figure 8:
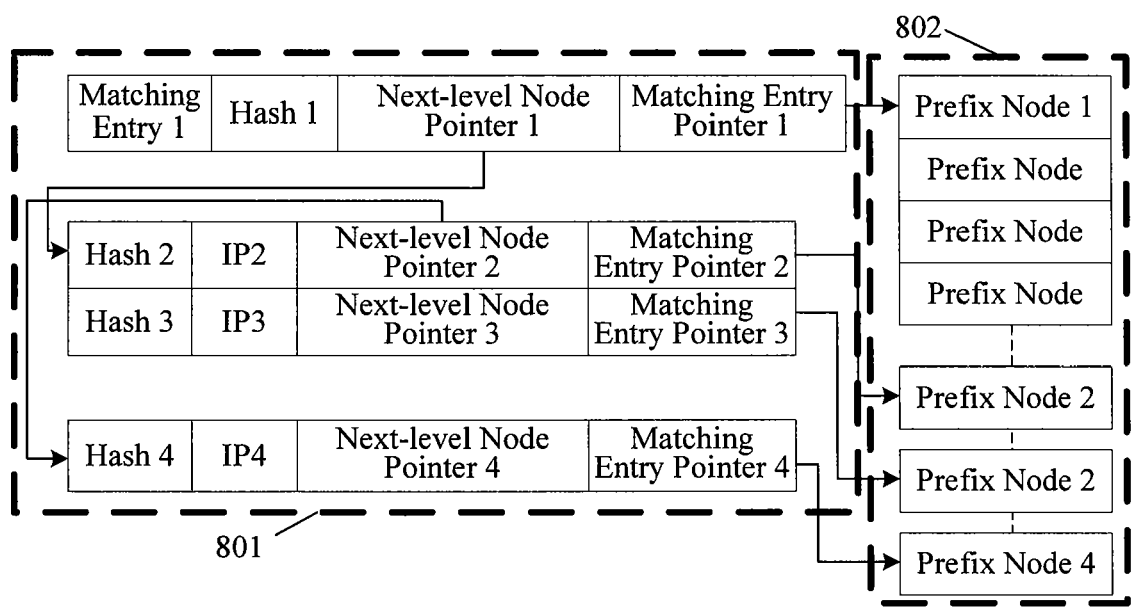
FIG. 8 shows a storage structure of a first embodiment of a method for storing a routing table according to one embedment of the disclosure.

After the embodiment of the method for storing a routing table according to the disclosure is used in the example, a schematic view of a storage structure of the first embodiment of the method for storing a routing table according to the disclosure is as shown in FIG. 8.

A dashed-line block 801 stores data of a next-level node pointer portion, and a dashed-line block 802 contains a matching entry portion and stores data of the matching entry portion, including prefix nodes.

"Matching Entry 1", "Hash 1", "Next-level Node Pointer 1", and "Matching Entry Pointer 1" are root node data. As known from FIG. 7, only one matching entry in the root node has a next-level node, so that the "Next-level Node Pointer" of only one matching entry needs to be stored in the first embodiment of the method for storing a routing table according to the disclosure. The first embodiment of the method for storing a routing table according to the disclosure selects to directly store matching entries of 0-8 bits, without hashing IP addresses of 0-8 bits. Thus, "Matching Entry 1" is a matching entry of the root node that has a next-level node pointer, and "Hash 1" is a root node hash function configured to hash an IP address in a step length range of a first-level node of the matching entry, i.e. a hash function configured to hash $9^{th}$-$16^{th}$ bits of an actual IP address. In order to avoid a collision of the hash results obtained through hashing the data to be hashed by using "Hash 1", "Hash 1" may be selected by using the method for selecting a hash function according to the disclosure. When the next-level node has only one address, no collision will occur, so that the hash function may be any alternative hash function, and may also be selected by using the method for selecting a hash function according to the disclosure. "Next-level Node Pointer 1" points to an address for storing the first-level node data, and a position for storing the first-level node data may be found by "Next-level Node Pointer 1". A hash result obtained by hashing the $9^{th}$-$16^{th}$ bits of the actual IP address by using "Hash 1" is taken as an offset, and the offset may be used together with "Next-level Node Pointer 1" to search corresponding data. "Matching Entry Pointer 1" points to a prefix node of "Prefix Node 1" corresponding to "Matching Entry 1".

As known from FIG. 7, two matching entries in the first-level node have a next-level node. "Hash 2", "IP 2", "Next-level Node Pointer 2", and "Matching Entry Pointer 2" form a first entry that stores data relevant to the matching entries having a next-level node in the first-level node. After the $9^{th}$-$16^{th}$ bits of the actual IP address of each matching entry are hashed, the hash result is taken as an offset address, and the data of a matching entry whose offset address is located in the entry is stored in the entry.

"Hash 2" is corresponding to the entry "Hash Function" in Table 7, which is a hash function of the first-level node, configured to hash an IP address in a step length range of a second-level node of the matching entry, i.e. a hash function configured to hash $17^{th}$-$24^{th}$ bits of an actual IP address. In order to avoid a collision of the hash results obtained through hashing the data to be hashed by using "Hash 2", "Hash 2" may be selected by using the method for selecting a hash function according to the disclosure. When the next-level node has only one address, no collision will occur, so that the hash function may be any alternative hash function, and may also be selected by using by using the method for selecting a hash function according to the disclosure. In the example of FIG. 7, the matching entry has only one next-level node, so any alternative hash function may be used as "Hash 2". "IP 2" is corresponding to the entry "IP" in Table 7. After $9^{th}$-$16^{th}$ bits of the matching entry having a next-level node are hashed by using "Hash 1", if the offset address thereof is located in the current entry, $9^{th}$-$16^{th}$ bits of the actual IP address, or several bits in the $9^{th}$-$16^{th}$ bits of the actual IP address are stored in "IP2" according to actual conditions. "Next-level Node Pointer 2" points to an address for storing the second-level node data of the current entry, so that a position for storing the second-level node data may be found by "Next-level Node Pointer 2". A hash result obtained through hashing the $17^{th}$-$24^{th}$ bits of the actual IP address by using "Hash 2" is taken as an offset, and the offset may be used together with "Next-level Node Pointer 2" to search corresponding data.

"Matching Entry Pointer 2" points to a prefix node of "Prefix node 2" corresponding to the current entry.

"Hash 3", "IP 3", "Next-level Node Pointer 3", and "Matching Entry Pointer 3" form a second entry that stores data relevant to the matching entries having a next-level node in the first-level node. After the $9^{th}$-$16^{th}$ bits of the actual IP address of the matching entry are hashed, the hash result thereof is taken as an offset address, and the data of a matching entry whose offset address is located in the entry is stored in the entry.

"Hash 3" is corresponding to the entry "Hash Function" in Table 7, which is a hash function of the first-level node, configured to hash an IP address in a step length range of a second-level node of the matching entry, i.e. a hash function configured to hash $17^{th}$-$24^{th}$ bits of an actual IP address. In order to avoid a collision of the hash results obtained through hashing the data to be hashed by using "Hash 3", "Hash 3" may be selected by using the method for selecting a hash function according to the disclosure. When the next-level node has only one address, no collision will occur, so that the hash function may be any alternative hash function, and may also be selected by using the method for selecting a hash function according to the disclosure. In the example of FIG. 7, the matching entry has no next-level node, so "Hash 3" is null. "IP 3" is corresponding to the entry "IP" in Table 7. After $9^{th}$-$16^{th}$ bits of the matching entry having a next-level node are hashed by using "Hash 1", if the offset address thereof is located in the current entry, $9^{th}$-$16^{th}$ bits of the actual IP address, or several bits in the $9^{th}$-$16^{th}$ bits of the actual IP address are stored to "IP 3" according to actual conditions. "Next-level Node Pointer 3" points to an address for storing the second-level node data of the current entry, and a position for storing the second-level node data may be found by "Next-level Node Pointer 3". A hash result obtained through hashing the $17^{th}$-$24^{th}$ bits of the actual IP address by using "Hash 3" is taken as an offset, and the offset may be used together with "Next-level Node Pointer 3" to search corresponding data. In the example of FIG. 7, the matching entry has no next-level node, so "Next-level Node Pointer 3" is null. "Matching Entry Pointer 3" points to a prefix node of "Prefix Node 3" corresponding to the current entry.

"Hash 2", "IP 2", "Next-level Node Pointer 2", "Matching Entry Pointer 2", "Hash 3 ", "IP 3", "Next-level Node Pointer 3", and "Matching Entry Pointer 3" constitute a subnode array.

As known from FIG. 7, only one matching entry in the second-level node has a next-level node, so the second-level node data only has one entry. "Hash 4", "IP 4", "Next-level Node Pointer 4", and "Matching Entry Pointer 4" form an entry that stores data relevant to the matching entry having a next-level node in the second-level node. After the $17^{th}$-$24^{th}$ bits of the actual IP address of the matching entry are hashed, a hash result thereof is taken as an offset address, and the data of a matching entry whose offset address is located in the entry is stored in the entry.

"Hash 4" corresponds to the entry "Hash Function" in Table 7, which is a hash function of the second-level node, configured to hash an IP address in a step length range of a third-level node of the matching entry, i.e. a hash function configured to hash $25^{th}$-$32^{nd}$ bits of an actual IP address. In order to avoid a collision of the hash results obtained through hashing the data to be hashed by using "Hash 4", "Hash 4" may be selected by using the method for selecting a hash function according to the disclosure. When the next-level node has only one address, no collision will occur, so that the hash function may be any alternative hash function, and may also be selected by using the method for selecting a hash function according to the disclosure. In the example of FIG. 7, the matching entry has no next-level node, so "Hash 4" is null. "IP 4" is corresponding to the entry "IP" in Table 7. After $17^{th}$-$24^{th}$ bits of the matching entry having a next-level node are hashed by using "Hash 2", if an offset address thereof is located in the current entry, $17^{th}$-$24^{th}$ bits of the actual IP address, or several bits in the $17^{th}$-$24^{th}$ bits of the actual IP address are stored to "IP 4" according to actual conditions. "Next-level Node Pointer 4" points to an address for storing the third-level node data of the current entry, and a position for storing the third-level node data may be found by "Next-level Node Pointer 4". A hash result obtained through hashing the $25^{th}$-$32^{nd}$ bits of the actual IP address by using "Hash 4" is taken as an offset, and the offset may be used together with "Next-level Node Pointer 4" to search corresponding data. In the example of FIG. 7, the matching entry has no next-level node, so "Next-level Node Pointer 4" is null. "Matching Entry Pointer 4" points to a prefix node of "Prefix Node 4" corresponding to the current entry.

According to FIG. 8, through the first embodiment of the method for storing a routing table according to the disclosure, the next-level node pointer portion that originally occupies the space of 28*4-3 entries of "Next-level Node Pointer" is hashed and then stored. As the length of the hash results is shortened after hashing, the occupied storage space is greatly reduced, thus effectively saving the space occupied by the routing table.

For example, when the step length is "8" before hashing and then turns to become "3" after hashing, the space occupied by one node is changed from 256 bits to 8 bits, so that more space will be saved for the entire routing table containing a plurality of nodes.

Furthermore, when a new routing IP address needs to be stored in the routing table, a hash function that causes no collision needs to be selected once again for storage according to the new routing IP address and the previously stored IP address.

If the embodiment of the method for storing a routing table of the disclosure is applied to larger routing tables, more space can be saved. Therefore, the embodiment of the method for storing a routing table of the disclosure can effectively save the space occupied by the routing table.

After a routing table is stored by using the first embodiment of the method for storing a routing table of the disclosure, assuming that a subnode with a step length of "8" has four matching entries having a next-level node pointer, a hash function is selected by using the method for selecting a hash function according to the disclosure, and the step length is "3" after hashing, including the data of next-level node pointer portions of the four matching entries. At this time, a data structure of the subnode in the next-level node pointer portion of the routing table is as shown Table 8.

TABLE 8

Data Structure of a Certain Subnode in the Next-level Node Pointer Portion of the Routing Table

| | | | | |
|---|---|---|---|---|
| 000 | | | | |
| 001 | Hash Function | IP | Next-level Node Pointer | Matching Entry Pointer |
| 010 | | | | |
| 011 | Hash Function | IP | Next-level Node Pointer | Matching Entry Pointer |
| 100 | Hash Function | IP | Next-level Node Pointer | Matching Entry Pointer |
| 101 | | | | |
| 110 | | | | |
| 111 | Hash Function | IP | Next-level Node Pointer | Matching Entry Pointer |

As known from the example of Table 8, although the step length becomes shorter after hashing, and a large amount of storage space is saved, some space is still wasted. In Table 8, the storage space for four entries is wasted, and the larger the step length after hashing is, the more space will be wasted. In order to reduce the wasted space, a second embodiment of a method for storing a routing table of the disclosure provides a method for hashing data segment by segment using a plurality of hash functions.

A matching entry having a next-level node pointer corresponding to a node is divided into several segments, a hash function that causes no collision is selected for each segment of the data to be hashed, and a corresponding hash function and a corresponding "Next-level Node Pointer" are stored according to each segment.

For example, a node with a step length of 8 may be divided into four segments, in which the first two bits of the data to be hashed may be used as a segment label for distinguishing different segments. Accordingly, the significant bits that need to be hashed are the last six bits, and it only needs to select a hash function that causes no collision according to the last six bits of the data to be hashed in the segment and then store the hash function together with the corresponding "Next-level Node Pointer" at a segment position of the entry. In this embodiment, as one node is divided into four segments, an entry of one node has four segment positions. In other embodiments, the storage space is assigned according to actual segment conditions.

The second embodiment of the method for storing a routing table of the disclosure is described as follows.

The routing table is divided into a next-level node pointer portion and a matching entry portion for being stored.

Root node data and first-level node data are stored at the next-level node pointer portion.

The root node data includes a root node matching entry with a next-level node pointer, a hash function of a root node segment of the matching entry, a next-level node pointer of the root node segment, and a matching entry pointer of a root node. The root node segment is a segment formed by dividing a next-level node of the root node matching entry into more than two segments. The hash function of the root node segment is a formal hash function selected for an IP address in a step length range of a first-level node in the root node segment of the matching entry by using the method for selecting a hash function according to claim 1. The matching entry pointer of the root node points to the matching entry portion.

The IP address in the step length range of the first-level node in the root node segment of the matching entry is hashed by using the hash function of the root node segment of the matching entry, and a hash result thereof is taken as an offset address to store the first-level node data of the root node segment at a position pointed to by a next-level node pointer of the root node.

The first-level node data includes the IP address in the step length range of the first-level node of the matching entry, a hash function of a first-level node segment of the matching entry, a next-level node pointer of the first-level node segment, and a matching entry pointer of the first-level node. The first-level node segment is a segment formed by dividing a next-level node of the first-level node of the matching entry into more than two segments. The hash function of the first-level node segment is a formal hash function selected for an IP address in a step length range of a second-level node in the root node segment of the matching entry by using the method for selecting a hash function according to claim 1.

The matching entry pointer of the first-level node points to the matching entry portion.

When more levels of nodes exist and the number of levels is N, the method further includes the following steps.

First, $N^{th}$-level node data is stored at the next-level node pointer portion.

Then, an IP address in a step length range of an $N^{th}$-level node in an $(N-1)^{th}$-level node segment is hashed by using a hash function of the $(N-1)^{th}$-level node segment of the matching entry, and a hash result thereof is taken as an offset address to store the $N^{th}$-level node data of the $(N-1)^{th}$-level node segment at a position pointed to by a next-level node pointer of the $(N-1)^{th}$-level node segment.

The $N^{th}$-level node data includes the IP address in the step length range of the $N^{th}$-level node of the matching entry, a hash function of an $N^{th}$-level node segment of the matching entry, a next-level node pointer of the $N^{th}$-level node segment, and a matching entry pointer of the $N^{th}$-level node. The hash function of the $N^{th}$-level node segment is a formal hash function selected for an IP address in a step length range of a $(N+1)^{th}$-level node in the root node segment of the matching entry by using the method for selecting a hash function according to claim 1.

The matching entry pointer of the $N^{th}$-level node points to the matching entry portion.

N is an integer greater than or equal to 2.

According to actual conditions, the IP address in the step length range may be a portion of or all of an actual IP address in the step length range.

As compared with the first embodiment of the method for storing a routing table of the disclosure, in the second embodiment of the method for storing a routing table of the disclosure, a matching entry having a next-level node pointer corresponding to each node is divided into several segments, and then a hash function is selected through the method for selecting a hash function of the disclosure and is used for hashing and storing, thus effectively saving the storage space. The smaller the step length is, the less the waste will be, so that after the data to be hashed is segmented, the number of significant bits for the hash functions that may be selected definitely becomes smaller, and accordingly, less waste is resulted. Here, an example is provided below for demonstrating how the space is saved.

It is assumed that eight data need to be stored, namely:
Key 1: 00000001;
Key 2: 00000010;
Key 3: 01000100;
Key 4: 01001000;
Key 5: 10010000;
Key 6: 10100000;
Key 7: 11000100; and
Key 8: 11010000.

Assuming that the method for selecting a hash function of the disclosure is directly used to select a hash function that cases no collision for the eight data, as the $7^{th}$ and $8^{th}$ bits of an 8-bit hash function are required to be 1 in order to distinguish Key 1 from Key 2, the $5^{th}$ and $6^{th}$ bits of an 8-bit hash function are required to be 1 in order to distinguish Key 3 from Key 4, the $3^{rd}$ and $4^{th}$ bits of an 8-bit hash function are required to be 1 in order to distinguish Key 5 from Key 6, the $1^{st}$ bit of an 8-bit hash function is required to be 1 in order to distinguish Key 3 from Key 7, and the $2^{nd}$ bit of an 8-bit hash function is required to be 1 in order to distinguish Key 5 from Key 8, only "11111111" can be used as the hash function, which occupies a storage space of 256 entries, among which eight entries are valid, and 248 entries are null.

Assuming that at most 256 possible 8-bit key values are equally divided into four segments according to the magnitude of the values, and the first two bits of all key values in each segment are the same. Thus, for each segment, only 6-bit data needs to be hashed. Here, the values are segmented as follows.

First segment: 00 000000-00 111111
Second segment: 01 000000-01 111111
Third segment: 10 000000-10 111111
Fourth segment: 11 000000-11 111111

After the segmentation, Key 1 and Key 2 belong to the first segment, and only one of the $5^{th}$ and $6^{th}$ bits of a 6-bit hash function is required to be 1, for example, 000010. Accordingly, only 2E1=2 entries of information storage space are required, which are all valid entries, and no space is wasted.

Key 3 and Key 4 belong to the second segment, and only one of the $3^{rd}$ and $4^{th}$ bits of a 6-bit hash function is required to be 1 in order to distinguish Key 3 from Key 4, for example, 000100. Accordingly, only 2E1=2 entries of information storage space are needed, which are all valid entries, and likewise, no space is wasted.

Key 5 and Key 6 belong to the third segment, and only one of the $1^{st}$ and $2^{nd}$ bits of a 6-bit hash function is required to be 1 in order to distinguish Key 5 from Key 6, for example, 010000. Accordingly, only 2E1=2 entries of information storage space are needed, which are all valid entries, and likewise, no space is wasted.

Key 7 and Key 8 belong to the fourth segment, and only one of the $2^{nd}$ and $4^{th}$ bits of a 6-bit hash function is required to be 1 in order to distinguish Key 7 from Key 8, for example, 010000. Accordingly, only 2E1=2 entries of information storage space are needed, which are all valid entries, and likewise, no space is wasted.

Therefore, after the segmentation, the storage of the information corresponding to the eight key values can be simply indexed by using four 6-bit hash functions, namely, 000010, 000100, 010000, and 010000. Eight entries of information space are required, and no space is wasted, so that 248 entries of space are saved.

In practical use, the data may not be distributed so evenly. If no data needs to be stored in a certain segment, no storage space needs to be assigned. Likewise, the storage space may be further saved. It should be understood that, the above circumstance is merely an extreme case. In practical use, according to the result of random emulation of a routing table with 1M entries, the number of next-level subnodes of each node is set to be n, and n is a distribution probability in the range of 0-256. For each particular value of n, the occupied space is calculated by using the first and second embodiments of the method for storing a routing table of the disclosure under the same distribution of IP addresses. It is assumed that the first embodiment adopts an 8-bit hash function, while the second embodiment divides the data into four segments and adopts a 6-bit hash function. After repeating for 10,000 times, average values thereof are calculated. Then, the average values are weighted according to the distribution probability. The result is as shown in Table 9.

TABLE 9

Emulation Result of Space-saving Effect

| Probability | Number of Subnode | Calculation Result of First Embodiment | Calculation Result of Second Embodiment |
| --- | --- | --- | --- |
| 0.00% | 1 | 100.00% | 100.00% |
| 0.00% | 2 | 100.00% | 100.00% |
| 0.00% | 3 | 133.33% | 100.00% |
| 0.00% | 4 | 123.05% | 100.00% |
| 0.00% | 5 | 163.90% | 100.00% |
| 0.00% | 6 | 155.60% | 100.00% |
| 0.00% | 7 | 178.49% | 100.00% |
| 0.00% | 8 | 201.11% | 100.00% |
| 0.00% | 9 | 206.88% | 133.33% |
| 0.00% | 10 | 219.36% | 133.33% |
| 0.00% | 11 | 243.10% | 133.33% |
| 0.00% | 12 | 262.73% | 133.33% |
| 0.00% | 13 | 275.67% | 135.60% |
| 0.00% | 14 | 289.25% | 135.60% |
| 0.00% | 15 | 306.76% | 135.60% |
| 0.00% | 16 | 327.20% | 135.60% |
| 0.00% | 17 | 346.60% | 169.66% |
| 0.00% | 18 | 365.81% | 169.66% |
| 0.00% | 19 | 382.62% | 169.66% |
| 0.00% | 20 | 398.37% | 169.66% |
| 0.00% | 21 | 409.40% | 174.33% |
| 0.00% | 22 | 428.76% | 174.33% |
| 0.00% | 23 | 451.21% | 174.33% |
| 0.00% | 24 | 463.17% | 174.33% |
| 0.01% | 25 | 480.73% | 201.89% |
| 0.02% | 26 | 494.07% | 201.89% |
| 0.04% | 27 | 508.94% | 201.89% |
| 0.08% | 28 | 520.73% | 201.89% |
| 0.12% | 29 | 533.98% | 220.54% |
| 0.18% | 30 | 539.07% | 220.54% |
| 0.28% | 31 | 549.02% | 220.54% |
| 0.34% | 32 | 559.26% | 220.54% |
| 0.58% | 33 | 564.89% | 235.15% |
| 0.73% | 34 | 570.13% | 235.15% |
| 1.07% | 35 | 574.67% | 235.15% |
| 1.23% | 36 | 575.86% | 235.15% |
| 1.59% | 37 | 582.73% | 253.44% |
| 1.89% | 38 | 582.47% | 253.44% |
| 2.46% | 39 | 580.46% | 253.44% |
| 2.67% | 40 | 576.21% | 253.44% |
| 2.74% | 41 | 575.83% | 273.06% |
| 3.02% | 42 | 569.05% | 273.06% |
| 3.51% | 43 | 564.06% | 273.06% |
| 2.88% | 44 | 556.22% | 273.06% |
| 3.24% | 45 | 549.23% | 287.91% |
| 2.90% | 46 | 541.36% | 287.91% |
| 3.13% | 47 | 532.64% | 287.91% |
| 2.77% | 48 | 523.76% | 287.91% |
| 2.49% | 49 | 515.92% | 299.62% |
| 2.02% | 50 | 506.78% | 299.62% |
| 1.86% | 51 | 498.27% | 299.62% |
| 1.37% | 52 | 489.60% | 299.62% |
| 1.28% | 53 | 480.85% | 307.26% |
| 1.01% | 54 | 472.46% | 307.26% |
| 0.77% | 55 | 464.24% | 307.26% |
| 0.54% | 56 | 456.48% | 307.26% |
| 0.32% | 57 | 448.79% | 315.89% |
| 0.25% | 58 | 441.05% | 315.89% |
| 0.22% | 59 | 433.64% | 315.89% |
| 0.24% | 60 | 426.47% | 315.89% |
| 0.11% | 61 | 419.57% | 321.23% |
| 0.04% | 62 | 412.86% | 321.23% |
| 0.05% | 63 | 406.31% | 321.23% |
| 0.05% | 64 | 399.98% | 321.23% |
| 0.10% | 65 | 393.79% | 324.37% |
| 0.16% | 66 | 387.84% | 324.37% |
| 0.14% | 67 | 382.05% | 324.37% |
| 0.25% | 68 | 376.45% | 324.37% |
| 0.27% | 69 | 371.01% | 322.20% |
| 0.36% | 70 | 365.71% | 322.20% |
| 0.41% | 71 | 360.55% | 322.20% |
| 0.70% | 72 | 355.56% | 322.20% |
| 0.56% | 73 | 350.68% | 316.43% |
| 0.88% | 74 | 345.95% | 316.43% |
| 0.98% | 75 | 341.33% | 316.43% |
| 1.10% | 76 | 336.84% | 316.43% |
| 1.10% | 77 | 332.47% | 308.35% |
| 1.47% | 78 | 328.21% | 308.35% |
| 1.53% | 79 | 324.05% | 308.35% |
| 1.81% | 80 | 320.00% | 308.35% |
| 1.85% | 81 | 316.05% | 298.93% |
| 1.67% | 82 | 312.20% | 298.93% |
| 1.68% | 83 | 308.43% | 298.93% |

TABLE 9-continued

Emulation Result of Space-saving Effect

| Probability | Number of Subnode | Calculation Result of First Embodiment | Calculation Result of Second Embodiment |
|---|---|---|---|
| 2.08% | 84 | 304.76% | 298.93% |
| 1.96% | 85 | 301.18% | 287.96% |
| 1.98% | 86 | 297.67% | 287.96% |
| 1.89% | 87 | 294.25% | 287.96% |
| 1.95% | 88 | 290.91% | 287.96% |
| 2.22% | 89 | 287.64% | 276.99% |
| 2.11% | 90 | 284.44% | 276.99% |
| 1.90% | 91 | 281.32% | 276.99% |
| 1.88% | 92 | 278.26% | 276.99% |
| 1.77% | 93 | 275.27% | 266.08% |
| 1.68% | 94 | 272.34% | 266.08% |
| 1.49% | 95 | 269.47% | 266.08% |
| 1.35% | 96 | 266.67% | 266.08% |
| 1.27% | 97 | 263.92% | 255.80% |
| 1.28% | 98 | 261.22% | 255.80% |
| 1.08% | 99 | 258.59% | 255.80% |
| 0.90% | 100 | 256.00% | 255.80% |
| 0.77% | 101 | 253.47% | 246.06% |
| 0.66% | 102 | 250.98% | 246.06% |
| 0.53% | 103 | 248.54% | 246.06% |
| 0.39% | 104 | 246.15% | 246.06% |
| 0.36% | 105 | 243.81% | 237.00% |
| 0.31% | 106 | 241.51% | 237.00% |
| 0.18% | 107 | 239.25% | 237.00% |
| 0.29% | 108 | 237.04% | 237.00% |
| 0.10% | 109 | 234.86% | 228.57% |
| 0.11% | 110 | 232.73% | 228.57% |
| 0.08% | 111 | 230.63% | 228.57% |
| 0.07% | 112 | 228.57% | 228.57% |
| 0.03% | 113 | 226.55% | 220.69% |
| 0.03% | 114 | 224.56% | 220.69% |
| 0.05% | 115 | 222.61% | 220.69% |
| 0.00% | 116 | 220.69% | 220.69% |
| 0.01% | 117 | 218.80% | 213.33% |
| 0.00% | 118 | 216.95% | 213.33% |
| 0.00% | 119 | 215.13% | 213.33% |
| 0.00% | 120 | 213.33% | 213.33% |
| 0.01% | 121 | 211.57% | 206.45% |
| 0.00% | 122 | 209.84% | 206.45% |
| 0.00% | 123 | 208.13% | 206.45% |
| 0.01% | 124 | 206.45% | 206.45% |
| 0.00% | 125 | 204.80% | 200.00% |
| 0.00% | 126 | 203.17% | 200.00% |
| 0.00% | 127 | 201.57% | 200.00% |
| 0.00% | 128 | 200.00% | 200.00% |
| 0.00% | 129 | 198.45% | 193.94% |
| 0.00% | 130 | 196.92% | 193.94% |
| 0.00% | 131 | 195.42% | 193.94% |
| 0.00% | 132 | 193.94% | 193.94% |
| 0.00% | 133 | 192.48% | 188.24% |
| 0.00% | 134 | 191.04% | 188.24% |
| 0.00% | 135 | 189.63% | 188.24% |
| 0.00% | 136 | 188.24% | 188.24% |
| 0.00% | 137 | 186.86% | 182.86% |
| 0.00% | 138 | 185.51% | 182.86% |
| 0.00% | 139 | 184.17% | 182.86% |
| 0.00% | 140 | 182.86% | 182.86% |
| 0.00% | 141 | 181.56% | 177.78% |
| 0.00% | 142 | 180.28% | 177.78% |
| 0.00% | 143 | 179.02% | 177.78% |
| 0.00% | 144 | 177.78% | 177.78% |
| 0.00% | 145 | 176.55% | 172.97% |
| 0.00% | 146 | 175.34% | 172.97% |
| 0.00% | 147 | 174.15% | 172.97% |
| 0.00% | 148 | 172.97% | 172.97% |
| 0.00% | 149 | 171.81% | 168.42% |
| 0.00% | 150 | 170.67% | 168.42% |
| 0.00% | 151 | 169.54% | 168.42% |
| 0.00% | 152 | 168.42% | 168.42% |
| 0.00% | 153 | 167.32% | 164.10% |
| 0.00% | 154 | 166.23% | 164.10% |
| 0.00% | 155 | 165.16% | 164.10% |
| 0.00% | 156 | 164.10% | 164.10% |
| 0.00% | 157 | 163.06% | 160.00% |
| 0.00% | 158 | 162.03% | 160.00% |
| 0.00% | 159 | 161.01% | 160.00% |
| 0.00% | 160 | 160.00% | 160.00% |
| 0.00% | 161 | 159.01% | 156.10% |
| 0.00% | 162 | 158.02% | 156.10% |
| 0.00% | 163 | 157.06% | 156.10% |
| 0.00% | 164 | 156.10% | 156.10% |
| 0.00% | 165 | 155.15% | 152.38% |
| 0.00% | 166 | 154.22% | 152.38% |
| 0.00% | 167 | 153.29% | 152.38% |
| 0.00% | 168 | 152.38% | 152.38% |
| 0.00% | 169 | 151.48% | 148.84% |
| 0.00% | 170 | 150.59% | 148.84% |
| 0.00% | 171 | 149.71% | 148.84% |
| 0.00% | 172 | 148.84% | 148.84% |
| 0.00% | 173 | 147.98% | 145.45% |
| 0.00% | 174 | 147.13% | 145.45% |
| 0.00% | 175 | 146.29% | 145.45% |
| 0.00% | 176 | 145.45% | 145.45% |
| 0.00% | 177 | 144.63% | 142.22% |
| 0.00% | 178 | 143.82% | 142.22% |
| 0.00% | 179 | 143.02% | 142.22% |
| 0.00% | 180 | 142.22% | 142.22% |
| 0.00% | 181 | 141.44% | 139.13% |
| 0.00% | 182 | 140.66% | 139.13% |
| 0.00% | 183 | 139.89% | 139.13% |
| 0.00% | 184 | 139.13% | 139.13% |
| 0.00% | 185 | 138.38% | 136.17% |
| 0.00% | 186 | 137.63% | 136.17% |
| 0.00% | 187 | 136.90% | 136.17% |
| 0.00% | 188 | 136.17% | 136.17% |
| 0.00% | 189 | 135.45% | 133.33% |
| 0.00% | 190 | 134.74% | 133.33% |
| 0.00% | 191 | 134.03% | 133.33% |
| 0.00% | 192 | 133.33% | 133.33% |
| 0.00% | 193 | 132.64% | 130.61% |
| 0.00% | 194 | 131.96% | 130.61% |
| 0.00% | 195 | 131.28% | 130.61% |
| 0.00% | 196 | 130.61% | 130.61% |
| 0.00% | 197 | 129.95% | 128.00% |
| 0.00% | 198 | 129.29% | 128.00% |
| 0.00% | 199 | 128.64% | 128.00% |
| 0.00% | 200 | 128.00% | 128.00% |
| 0.00% | 201 | 127.36% | 125.49% |
| 0.00% | 202 | 126.73% | 125.49% |
| 0.00% | 203 | 126.11% | 125.49% |
| 0.00% | 204 | 125.49% | 125.49% |
| 0.00% | 205 | 124.88% | 123.08% |
| 0.00% | 206 | 124.27% | 123.08% |
| 0.00% | 207 | 123.67% | 123.08% |
| 0.00% | 208 | 123.08% | 123.08% |
| 0.00% | 209 | 122.49% | 120.75% |
| 0.00% | 210 | 121.90% | 120.75% |
| 0.00% | 211 | 121.33% | 120.75% |
| 0.00% | 212 | 120.75% | 120.75% |
| 0.00% | 213 | 120.19% | 118.52% |
| 0.00% | 214 | 119.63% | 118.52% |
| 0.00% | 215 | 119.07% | 118.52% |
| 0.00% | 216 | 118.52% | 118.52% |
| 0.00% | 217 | 117.97% | 116.36% |
| 0.00% | 218 | 117.43% | 116.36% |
| 0.00% | 219 | 116.90% | 116.36% |
| 0.00% | 220 | 116.36% | 116.36% |
| 0.00% | 221 | 115.84% | 114.29% |
| 0.00% | 222 | 115.32% | 114.29% |
| 0.00% | 223 | 114.80% | 114.29% |
| 0.00% | 224 | 114.29% | 114.29% |
| 0.00% | 225 | 113.78% | 112.28% |
| 0.00% | 226 | 113.27% | 112.28% |
| 0.00% | 227 | 112.78% | 112.28% |
| 0.00% | 228 | 112.28% | 112.28% |
| 0.00% | 229 | 111.79% | 110.34% |
| 0.00% | 230 | 111.30% | 110.34% |
| 0.00% | 231 | 110.82% | 110.34% |

TABLE 9-continued

Emulation Result of Space-saving Effect

| Probability | Number of Subnode | Calculation Result of First Embodiment | Calculation Result of Second Embodiment |
|---|---|---|---|
| 0.00% | 232 | 110.34% | 110.34% |
| 0.00% | 233 | 109.87% | 108.47% |
| 0.00% | 234 | 109.40% | 108.47% |
| 0.00% | 235 | 108.94% | 108.47% |
| 0.00% | 236 | 108.47% | 108.47% |
| 0.00% | 237 | 108.02% | 106.67% |
| 0.00% | 238 | 107.56% | 106.67% |
| 0.00% | 239 | 107.11% | 106.67% |
| 0.00% | 240 | 106.67% | 106.67% |
| 0.00% | 241 | 106.22% | 104.92% |
| 0.00% | 242 | 105.79% | 104.92% |
| 0.00% | 243 | 105.35% | 104.92% |
| 0.00% | 244 | 104.92% | 104.92% |
| 0.00% | 245 | 104.49% | 103.23% |
| 0.00% | 246 | 104.07% | 103.23% |
| 0.00% | 247 | 103.64% | 103.23% |
| 0.00% | 248 | 103.23% | 103.23% |
| 0.00% | 249 | 102.81% | 101.59% |
| 0.00% | 250 | 102.40% | 101.59% |
| 0.00% | 251 | 101.99% | 101.59% |
| 0.00% | 252 | 101.59% | 101.59% |
| 0.00% | 253 | 101.19% | 100.00% |
| 0.00% | 254 | 100.79% | 100.00% |
| 0.00% | 255 | 100.39% | 100.00% |
| 0.00% | 256 | 100.00% | 100.00% |

As known from Table 9, the space saved by using the second embodiment of the method for storing a routing table of the disclosure is no less than 26% with respect to the first embodiment of the method for storing a routing table of the disclosure.

The above descriptions are embodiments of the method for storing a routing table of the disclosure. Accordingly, the disclosure further provides embodiments of a method for searching a routing table.

A first embodiment of the method for searching a routing table of the disclosure is carried out under a precondition of storing a next-level node pointer portion of the routing table by using the first embodiment of the method for storing a routing table of the disclosure.

The first embodiment of the method for searching a routing table of the disclosure includes the following steps.

An IP address to be searched is directly searched according to a directly stored length of a next-level node pointer portion for storing the routing table.

Searched root node data is read.

If a next-level node pointer exists in the root node data, a root node hash function in the acquired root node data is used to hash an IP address in a step length range of a next-level node, and search next-level node data by using the next-level node pointer and a hash result as an offset.

A matching entry is read according to a searched result.

Figure 9:
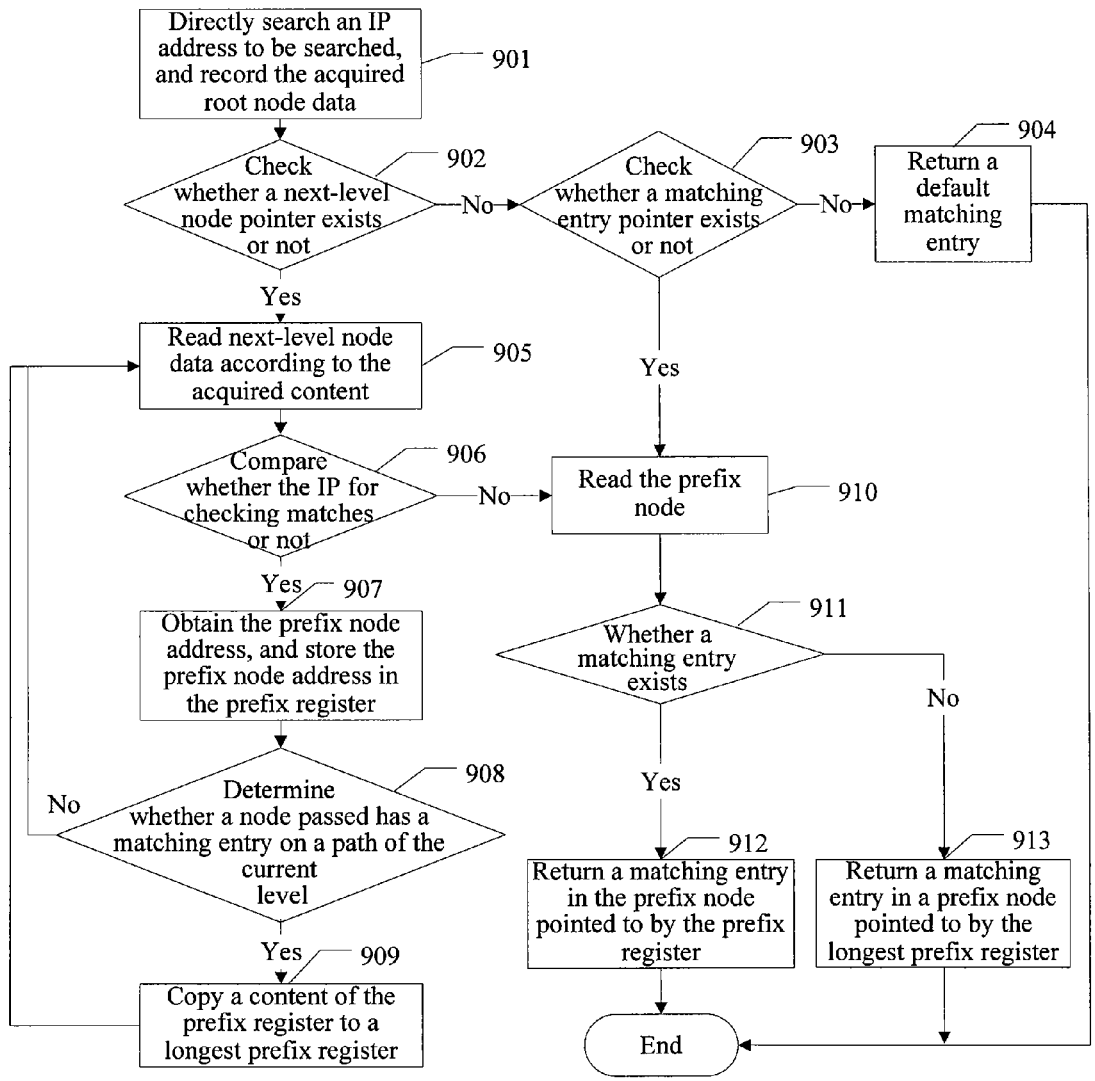
FIG. 9 is a flow chart of a first embodiment of a method for searching a routing table according to one embedment of the disclosure.

FIG. 9 is a flow chart of a first embodiment of a method for searching a routing table according to the disclosure.

In step 901, an IP address to be searched is directly searched according to a directly-stored bit length, and acquired root node data is recorded.

When the searched operation is started, an IP address of corresponding bits is directly searched according to a directly-stored bit length. For example, if a matching entry of 0-8 bits that is directly stored is selected during the storage, 0-8$^{th}$ bits of the IP address to be searched are used to directly search the next-level node pointer of the routing table.

In step 902, it is checked whether a next-level node pointer exists in the acquired root node data or not, and if yes, step 905 is performed; otherwise, step 903 is performed.

If the next-level node pointer exists, it is indicated that a longer prefix matching entry exists, and the searched operation needs to be continued. Otherwise, it is indicated that neither a longer prefix matching entry nor a subnode exists.

In step 903, it is checked whether a matching entry pointer exists in the root node data or not, and if yes, a prefix node address is acquired according to the matching entry pointer and then stored in a prefix register, and step 910 is performed; otherwise, step 904 is performed.

If the step length is 8, at most 255 bits are required to record matching entries of one node. A memory has a 128-bit structure. As other information also needs to be recorded, four 128-bit spaces are needed for recording. However, if the node has a small number of matching entries, the whole node may be recorded by using only several 8-bit spaces. Such a recording mode is referred to as a compact mode. If the node has more matching entries, four 128-bit spaces are needed, which is referred to as a full mode.

In the compact mode, the matching entry pointer directly points to the prefix node address, and the address is stored in the prefix register. In the full mode, as the data may be divided into a plurality of portions for recording, the prefix node address may be obtained according to an offset rule and the matching entry pointer, and then stored in the prefix register.

The full mode and the offset calculation rule are described through an example. For example, when the step length is 8, one node needs 255 bits to record matching entries thereof. The structure of the memory used in the disclosure is 128-bit. As other relevant data also needs to be recorded, four 128-bit prefix node storage spaces are generally used to record the matching entries of the node. 255-bit data is divided into four portions for storage, and the four storage spaces may be distinguished from each other by using two bits. After each matching entry is divided by 4, 6 bits are left, and the first 2 bits may be taken as an offset entry. A prefix node storage space is selected for storage according to the first 2 bits. When the offset is calculated, the first 2 bits are taken as an offset address, and then the prefix node address is obtained according to the offset address together with the acquired "Matching Entry Pointer". For example, as for 10101101, 10 is taken as the offset address.

In step 904, a default matching entry is returned, and the process is ended.

If no matching entry pointer exists, it is indicated that the current level has no matching entry.

In step 905, the next-level node data is read according to the content acquired through the searched operation.

Based on the acquired "Next-level Node Pointer", an IP address in a step length range of a next-level node is hashed by using the hash function acquired in step 901, and a hash result thereof is taken as an offset address to read "Hash Function", "IP", "Next-level Node Pointer", and "Matching Entry Pointer" in the next-level node data.

The process of hashing the IP address in the step length range of the next-level node by using the hash function is described below through an example. For example, if the step length is "8", 9$^{th}$-16$^{th}$ bits of the IP address are hashed; if the step length is "16", 17$^{th}$-32$^{nd}$ bits of the IP address are hashed, and so forth.

In step 906, it is determined whether the IP for checking matches or not, and if yes, step 907 is performed; otherwise, step 910 is performed.

It is determined whether the IP for checking that is read in step 905 matches with the hashed IP address or not, and if yes, step 907 is performed; otherwise, step 910 is performed.

In step 907, the prefix node address is obtained according to the read matching entry pointer, and stored in the prefix register.

In the compact mode, the matching entry pointer directly points to the prefix node address, and the address is stored in the prefix register. In the full mode, as the data may be divided into a plurality of portions for recording, the prefix node address may be obtained according to an offset rule and the matching entry pointer, and then stored in the prefix register.

In step 908, a parent longest prefix match (PLPM) label is checked, so as to determine whether a node passed has a matching entry on a path of the current level or not according to the PLPM label, and if yes, step 909 is performed; otherwise, step 905 is performed to continuously read next-level node data.

In step 909, a content of the prefix register is copied to a longest prefix register, and then step 905 is performed to continuously read next-level node data.

The longest prefix register is configured to store a pointer of a prefix node where a currently longest prefix exists.

In step 910, the prefix node is read according to a value of the prefix register.

In step 911, it is checked whether a matching entry exists in the prefix node or not, and if yes, step 912 is performed; otherwise, step 913 is performed.

In step 912, the matching entry in the prefix node is returned, and the searched operation is ended.

If any matching entry exists in the prefix node, the matching entry in the prefix node is directly returned, and the searched operation is ended.

In step 913, a matching entry in a prefix node pointed to by the longest prefix register is returned, and the searched operation is ended.

If no matching entry exists in the prefix node, the matching entry in the prefix node pointed to by the longest prefix register is returned, and the searched operation is ended.

Through the first embodiment of the method for searching a routing table of the disclosure, when the routing table is stored, it does not need to assign the space for storing "Next-level Node Pointer" to all entries, and instead, the next-level node pointer portion is hashed first and then stored. As the length of the hash result is shortened, the occupied storage space is greatly reduced accordingly, thus effectively saving the space occupied by the routing table.

For example, when the step length is "8" before hashing and turns to be "3" after hashing, the space occupied by one node is changed from 256 bits to 8 bits, so that more space will be saved for the entire routing table containing a plurality of nodes.

A second embodiment of the method for searching a routing table of the disclosure is carried out under a precondition of storing a next-level node pointer portion of the routing table by using the second embodiment of the method for storing a routing table of the disclosure.

The second embodiment of the method for searching a routing table of the disclosure includes the following steps.

An IP address to be searched is directly searched according to a directly stored length of a next-level node pointer portion for storing the routing table.

Searched root node data is read.

The acquired root node data is searched according to a segment label of the IP address to be searched, so as to acquire root node segment data corresponding to the segment label.

If a next-level node pointer exists in the root node segment data, a hash function in the root node segment data is used to hash a valid IP address in a step length range of a next-level node, and the next-level node pointer and a hash result are taken as an offset to search next-level node data.

A matching entry is read according to a searched result.

If no next-level node pointer exists in the root node segment data, it is checked whether a matching entry pointer exists in the root node data or not. A prefix node is read according to a matching entry pointer in the root node data if any matching entry pointer exists in the root node data, and a matching entry in the prefix node is returned if any matching entry exists in the prefix node; otherwise, a default matching entry is returned.

If no matching entry exists in the prefix node after the prefix node is read, a matching entry in a prefix node pointed to by the longest prefix register is returned.

The reading the matching entry according to the searched result includes the following steps.

The acquired next-level node data is read, and a matching entry pointer and an IP address are read; the acquired next-level node data is searched according to the segment label of the IP address to be searched, and a hash function of a next-level node segment corresponding to the segment label and a next-level node pointer of the next-level node segment are read.

A prefix node address is acquired according to the matching entry pointer in the next-level node data if an actual IP address in a step length range to be looked up matches with the acquired IP address, and the prefix node address is stored in a prefix register.

A content of the prefix register is copied to a longest prefix register if a node passed has a matching entry on a path of the current level; the hash function of the next-level node segment is used to hash the valid IP address in the step length range of the next-level node; the acquired next-level node pointer of the next-level node segment and a hash result are taken as an offset to search next-level node data; and then the acquired next-level node data, and the matching entry pointer and the IP address are continuously read.

The hash function of the next-level node segment is used to hash the valid IP address in the step length range of the next-level node if the node passed has no matching entry on the path of the current level; the acquired next-level node pointer of the next-level node segment and a hash result are taken as an offset to search next-level node data; and the acquired next-level node data, the matching entry pointer, and the IP address are continuously read.

A prefix node is read according to the prefix node address stored in the prefix register if the actual IP address in the step length range to be searched does not match with the acquired IP address, and a matching entry in the prefix node is returned if any matching entry exists in the prefix node.

As compared with the first embodiment of the method for searching a routing table of the disclosure, when the routing table is stored in the second embodiment of the method for searching a routing table of the disclosure, each matching entry having a next-level node pointer corresponding to each node is divided into several segments, and then a hash function is selected by using the method for selecting a hash function according to the disclosure and is used for hashing and storing, thus effectively saving the storage space.

Those of ordinary skill in the art should understand that, all or a part of steps in the methods according to the above embodiments may be implemented by instructing relevant hardware through a program. The program may be stored in a computer readable storage medium. When the program is executed, the following steps are performed.

A method for selecting a hash function is performed, which includes the following steps.

Data to be hashed is input. The data to be hashed is hashed by using a current alternative hash function. A hash result is decoded. Decoded results are accumulated. If a carry occurs during the accumulation, replace the current alternative hash function with a next alternative hash function to hash the data to be hashed until no carry occurs during the accumulation, and a current alternative hash function with no carry is selected as a formal hash function.

A method for storing a routing table is performed, which includes the following steps.

The routing table is divided into a next-level node pointer portion and a matching entry portion for being stored.

Root node data and first-level node data are stored at the next-level node pointer portion.

The root node data includes a root node matching entry with a next-level node pointer, a root node hash function of the matching entry, a next-level node pointer of a root node, and a matching entry pointer of the root node. The root node hash function is a formal hash function selected by using the method for selecting a hash function according to claim 1. The matching entry pointer of the root node points to the matching entry portion.

An Internet protocol (IP) address in a step length range of a first-level node of the matching entry is hashed by using the root node hash function of the matching entry, and the first-level node data at a position pointed to by the next-level node pointer of the root node is stored by using a hash result as an offset address.

The first-level node data includes the IP address in the step length range of the first-level node of the matching entry, a hash function of the first-level node of the matching entry, a next-level node pointer of the first-level node, and a matching entry pointer of the first-level node. The hash function of the first-level node is a formal hash function selected by using the method for selecting a hash function according to claim 1.

The matching entry pointer of the first-level node points to the matching entry portion.

A method for storing a routing table is performed, which includes the following steps.

The routing table is divided into a next-level node pointer portion and a matching entry portion for being stored.

Root node data and first-level node data are stored at the next-level node pointer portion.

The root node data includes a root node matching entry with a next-level node pointer, a hash function of a root node segment of the matching entry, a next-level node pointer of the root node segment, and a matching entry pointer of a root node. The root node segment is a segment formed by dividing a next-level node of the root node matching entry into more than two segments. The hash function of the root node segment is a formal hash function selected for an IP address in a step length range of a first-level node in the root node segment of the matching entry by using the method for selecting a hash function according to claim 1. The matching entry pointer of the root node points to the matching entry portion.

The IP address in the step length range of the first-level node in the root node segment of the matching entry is hashed by using the hash function of the root node segment of the matching entry, and the first-level node data of the root node segment at a position pointed to by a next-level node pointer of the root node is stored by using a hash result as an offset address.

The first-level node data includes the IP address in the step length range of the first-level node of the matching entry, a hash function of a first-level node segment of the matching entry, a next-level node pointer of the first-level node segment, and a matching entry pointer of the first-level node. The first-level node segment is a segment formed by dividing a next-level node of the first-level node of the matching entry into more than two segments. The hash function of the first-level node segment is a formal hash function selected for an IP address in a step length range of a second-level node in the root node segment of the matching entry by using the method for selecting a hash function according to claim 1.

The matching entry pointer of the first-level node points to the matching entry portion.

A method for searching a routing table is performed, which includes the following steps.

An IP address to be searched is directly searched according to a directly stored length of a next-level node pointer portion for storing a routing table.

The searched root node data is read.

When a next-level node pointer exists in the root node data, an IP address in a step length range of a next-level node is hashed by using a root node hash function in the acquired root node data, and the next-level node data is searched by using the next-level node pointer and a hash result as an offset.

A matching entry is read according to a searched result.

A method for searching a routing table is performed, which includes the following steps.

An IP address to be searched is directly searched according to a directly stored length of a next-level node pointer portion for storing a routing table.

The searched root node data is read.

The searched root node data is searched according to a segment label of the IP address to be searched so as to acquire root node segment data corresponding to the segment label.

When a next-level node pointer exists in the root node segment data, a valid IP address in a step length range of a next-level node is hashed by using a hash function in the root node segment data, and the next-level node data is searched by using the next-level node pointer and a hash result as an offset.

A matching entry is read according to a searched result.

The above-mentioned storage medium may be a read-only memory (ROM), a magnetic disk, an optical disk, and the like.

A first embodiment of a device for storing a routing table of the disclosure is provided, which includes a first matching entry unit and a first next-level node pointer unit.

The first matching entry unit is configured to store a matching entry portion of the routing table.

The first next-level node pointer unit is configured to store root node data and first-level node data.

The root node data includes a root node matching entry with a next-level node pointer, a root node hash function of the matching entry, a next-level node pointer of a root node, and a matching entry pointer of the root node. The root node hash function is a formal hash function selected by using the method for selecting a hash function according to claim 1. The matching entry pointer of the root node points to the matching entry portion.

An IP address in a step length range of a first-level node of the matching entry is hashed by using the root node hash function of the matching entry, and a hash result is taken as an offset address to store the first-level node data at a position pointed to by the next-level node pointer of the root node.

The first-level node data includes the IP address in the step length range of the first-level node of the matching entry, a hash function of the first-level node of the matching entry, a next-level node pointer of the first-level node, and a matching entry pointer of the first-level node. The hash function of the first-level node is a formal hash function selected by using the method for selecting a hash function according to claim 1.

The matching entry pointer of the first-level node points to the matching entry portion.

The first next-level node pointer unit is further configured to:
store $N^{th}$-level node data; and
hash an IP address in a step length range of an $N^{th}$-level node by using a hash function of an $(N-1)^{th}$-level node of the matching entry, and store the $N^{th}$-level node data at a position pointed to by the next-level node pointer of the $(N-1)^{th}$-level node by using a hash result as an offset address;
where the $N^{th}$-level node data comprises the IP address in the step length range of the $N^{th}$-level node of the matching entry, a hash function of the $N^{th}$-level node of the matching entry, a next-level node pointer of the $N^{th}$-level node, and a matching entry pointer of the $N^{th}$-level node; and the hash function of the $N^{th}$-level node is a formal hash function selected by using the method for selecting a hash function according to claim 1;
the matching entry pointer of the $N^{th}$-level node points to the matching entry portion; and
N is an integer greater than or equal to 2.

A second embodiment of the device for storing a routing table of the disclosure is provided, which includes a second matching entry unit and a second next-level node pointer unit.

The second matching entry unit is configured to store a matching entry portion of the routing table.

The second next-level node pointer unit is configured to store root node data and first-level node data.

The root node data includes a root node matching entry with a next-level node pointer, a hash function of a root node segment of the matching entry, a next-level node pointer of the root node segment, and a matching entry pointer of a root node. The root node segment is a segment formed by dividing a next-level node of the root node matching entry into more than two segments. The hash function of the root node segment is a formal hash function selected for an IP address in a step length range of a first-level node in the root node segment of the matching entry by using the method for selecting a hash function according to claim 1. The matching entry pointer of the root node points to the matching entry portion.

The IP address in the step length range of the first-level node in the root node segment of the matching entry is hashed by using the hash function of the root node segment of the matching entry, and the first-level node data of the root node segment at a position pointed to by a next-level node pointer of the root node is stored by using a hash result as an offset address.

The first-level node data includes the IP address in the step length range of the first-level node of the matching entry, a hash function of a first-level node segment of the matching entry, a next-level node pointer of the first-level node segment, and a matching entry pointer of the first-level node. The first-level node segment is a segment formed by dividing a next-level node of the first-level node of the matching entry into more than two segments. The hash function of the first-level node segment is a formal hash function selected for an IP address in a step length range of a second-level node in the root node segment of the matching entry by using the method for selecting a hash function according to claim 1.

The matching entry pointer of the first-level node points to the matching entry portion.

The second next-level node pointer unit is further configured to:
store $N^{th}$-level node data; and
hash an IP address in a step length range of an $N^{th}$-level node in an $(N-1)^{th}$-level node segment by using a hash function of the $(N-1)^{th}$-level node segment of the matching entry, and store the $N^{th}$-level node data of the $(N-1)^{th}$-level node segment at a position pointed to by a next-level node pointer of the $(N-1)^{th}$-level node segment by using a hash result as an offset address;
where the $N^{th}$-level node data comprises the IP address in the step length range of the $N^{th}$-level node of the matching entry, a hash function of an $N^{th}$-level node segment of the matching entry, a next-level node pointer of the $N^{th}$-level node segment, and a matching entry pointer of the $N^{th}$-level node; and the hash function of the $N^{th}$-level node segment is a formal hash function selected for an IP address in a step length range of a $(N+1)^{th}$-level node in the root node segment of the matching entry by using the method for selecting a hash function according to claim 1;
the matching entry pointer of the $N^{th}$-level node points to the matching entry portion; and
N is an integer greater than or equal to 2.

A first embodiment of a device for searching a routing table of the disclosure is provided, which includes a first direct searched unit, a first reading unit, a first hash searched unit, and a second reading unit.

The first direct searched unit is configured to directly search an IP address to be searched according to a directly stored length of a next-level node pointer portion for storing the routing table.

The first reading unit is configured to read root node data acquired by the first direct searched unit.

The first hash searched unit is configured to hash an IP address to be searched in a step length range of a next-level node by using a root node hash function in the root node data read by the first reading unit if a next-level node pointer exists in the root node data, and search next-level node data by using the next-level node pointer and a hash result as an offset.

The second reading unit is configured to read a matching entry according to a searched result about the next-level node data acquired by the first hash searched unit.

In addition, the device further includes a first matching entry unit.

The first matching entry unit is configured to check whether a matching entry pointer exists in the root node data read by the first reading unit or not when no next-level node pointer exists in the root node data; read a prefix node according to a matching entry pointer in the root node data when any matching entry pointer exists in the root node data; and return a matching entry in the prefix node when any matching entry exists in the prefix node; otherwise, return a default matching entry.

The second reading unit includes a first next-level node reading unit, a first matching unit, a second hash searched unit, a third hash searched unit, and a second matching unit.

The first next-level node reading unit is configured to read a hash function, a next-level node pointer, a matching entry pointer, and an IP address in the next-level node data searched by the first hash searched unit.

The first matching unit is configured to acquire a prefix node address according to the matching entry pointer in the next-level node data when an IP address in a step length range to be searched matches with the IP address read by the first next-level node reading unit, and store the prefix node address in a prefix register.

The second hash searched unit is configured to copy a content of the prefix register to a longest prefix register when a node passed has a matching entry on a path of the current level; hash the IP address in the step length range of the next-level node by using the hash function read by the first next-level node reading unit; search next-level node data by using the next-level node pointer read by the first next-level node reading unit and a hash result as an offset; and control the first next-level node reading unit to resume reading a hash function, a next-level node pointer, and a matching entry pointer in the acquired next-level node data.

The third hash searched unit is configured to hash the IP address in the step length range of the next-level node by using the hash function read by the first next-level node reading unit when the node passed has no matching entry on the path of the current level; search next-level node data by using the next-level node pointer read by the first next-level node reading unit and a hash result as an offset; and control the first next-level node reading unit to resume reading a hash function, a next-level node pointer, and a matching entry pointer in the acquired next-level node data.

The second matching unit is configured to read a prefix node according to the prefix node address stored in the prefix register when the IP address in the step length range to be searched does not match with the IP address read by the first next-level node reading unit, and return a matching entry in the prefix node when any matching entry exists in the prefix node.

In addition, the device further includes a second matching entry unit.

The second matching entry unit is configured to return a matching entry in a prefix node pointed to by the longest prefix register when no matching entry exists in the prefix node after the first matching entry unit or the second matching unit reads the prefix node.

A second embodiment of the device for searching a routing table of the disclosure is provided, which includes a second direct searched unit, a segment data acquisition unit, a fourth hash searched unit, and a third reading unit.

The second direct searched unit is configured to directly search an Internet protocol (IP) address to be searched according to a directly stored length of a next-level node pointer portion for storing the routing table.

The segment data acquisition unit is configured to read root node data searched by the second direct searched unit; and search the searched root node data according to a segment label of the IP address to be searched so as to acquire root node segment data corresponding to the segment label.

The fourth hash searched unit is configured to hash a valid IP address in a step length range of a next-level node by using a hash function in the root node segment data acquired by the segment data acquisition unit when a next-level node pointer exists in the root node segment data, and search next-level node data by using the next-level node pointer and a hash result as an offset.

The third reading unit is configured to read a matching entry according to a searched result about the next-level node data acquired by the fourth hash searched unit.

In addition, the device further includes a third matching entry unit.

The third matching entry unit is configured to check whether a matching entry pointer exists in the root node data or not when no next-level node pointer exists in the root node segment data acquired by the second direct searched unit; read a prefix node according to a matching entry pointer in the root node data when any matching entry pointer exists in the root node data; and return a matching entry in the prefix node when any matching entry exists in the prefix node; otherwise, return a default matching entry.

The third reading unit includes a second next-level node reading unit, a third matching unit, a fifth hash searched unit, a sixth hash searched unit, and a fourth matching unit.

The second next-level node reading unit is configured to read the next-level node data searched by the fourth hash searched unit, and read a matching entry pointer and an IP address; search the acquired next-level node data according to the segment label of the IP address to be searched; and read a hash function of a next-level node segment corresponding to the segment label and a next-level node pointer of the next-level node segment.

The third matching unit is configured to acquire a prefix node address according to the matching entry pointer in the next-level node data when an IP address in a step length range to be searched matches with the IP address read by the second next-level node reading unit, and store the prefix node address in a prefix register.

The fifth hash searched unit is configured to copy a content of the prefix register to a longest prefix register when a node passed has a matching entry on a path of the current level; hash the valid IP address in the step length range of the next-level node by using the hash function of the next-level node segment read by the second next-level node reading unit; search next-level node data by using the next-level node pointer of the next-level node segment read by the second next-level node reading unit and a hash result as an offset; and control the second next-level node reading unit to resume reading the searched next-level node data.

The sixth hash searched unit is configured to hash the valid IP address in the step length range of the next-level node by using the hash function of the next-level node segment read by the second next-level node reading unit when the node passed has no matching entry on the path of the current level; search next-level node data by using the next-level node pointer of the next-level node segment read by the second next-level node reading unit and a hash result as an offset; and control the second next-level node reading unit to resume reading the searched next-level node data.

The fourth prefixing unit is configured to read a prefix node according to the prefix node address stored in the prefix register when the IP address in the step length range to be searched does not match with the IP address read by the second next-level node reading unit, and return a matching entry in the prefix node when any matching entry exists in the prefix node.

The device further includes a fourth prefix unit.

The fourth prefix unit is configured to return a matching entry in a prefix node pointed to by the longest prefix register when no matching entry exists in the prefix node after the third matching entry unit or the fourth matching unit reads the prefix node.

The specific implementations of embodiments of the device for storing a routing table and the device for searching a routing table of the disclosure can be obtained with reference to the embodiments of the method for storing a routing table and the method for searching a routing table of the disclosure as described above, and the details will not be described herein again.

The method for selecting a hash function, the method for storing a routing table, and the method for searching a routing table and devices thereof according to the disclosure have been described in detail above. The principles and implementations of the disclosure are described herein through specific examples. The descriptions about the embodiments of the disclosure are provided, so that the methods and core ideas of the disclosure can be understood more easily. Those of ordinary skill in the art can make variations and modifications to the disclosure in terms of the specific implementations and application scopes according to the ideas of the disclosure. Therefore, the specification shall not be construed as limitations to the disclosure.

What is claimed is:

1. A method for selecting a hash function, comprising:
inputting a plurality of data to be hashed;
hashing the plurality of data to be hashed by using a current alternative hash function;
decoding hash results hashed from the plurality of date by using the current alternative hash function; and
during accumulating the decoded hash results: if a carry occurs, replacing the current alternative hash function with a next alternative hash function and continue hashing remaining of the plurality of data until no carry occurs during the accumulation; and if no carry occurs, selecting a current alternative hash function as a formal hash function.

2. The method according to claim 1, wherein the inputting of the plurality of data to be hashed comprises:
inputting the plurality of data to be hashed in parallel; or
inputting the plurality of data to be hashed in serial; or
inputting the plurality of data to be hashed in serial-parallel.

3. The method according to claim 2, wherein the hashing of the plurality of data to be hashed by using the current alternative hash function comprises:
filtering the plurality of data to be hashed by using a significant bit of the current alternative hash function.

4. The method according to claim 3, wherein the replacing of the current alternative hash function with the next alternative hash function comprises:
randomly selecting a next alternative hash function to replace the current alternative hash function; or
selecting a next alternative hash function in a descending order to replace the current alternative hash function; or
selecting a next alternative hash function in an ascending order of the number of significant bits to replace the current alternative hash function.

5. A device for selecting a hash function, comprising an alternative hash function unit, at least one hash unit, at least one decoder and an accumulator wherein:
the alternative hash function unit, configured to send a current alternative hash function to the at least one hash unit;
the at least one hash unit, configured to receive a plurality of input data to be hashed and hashing the plurality of input data to be hashed by using the current alternative hash function sent by the alternative hash function unit;
the at least one decoder, configured to decode each hash result of the at least one hash unit; and
the accumulator, configured to accumulate decoded results of the at least one decoder, and instruct the alternative hash function unit to replace the current alternative hash function with a next alternative hash function, if a carry occurs; otherwise, instruct the alternative hash function unit to select the current alternative hash function with no carry generated as a formal hash function, if no carry occurs.

6. The device according to claim 5, wherein the device comprises at least two hash units and at least two decoders, the at least two hash units are one-to-one corresponding to the at least two decoders, and the at least two decoders send decoded results to the accumulator after decoding hash results of the corresponding hash units.

7. The device according to claim 5, wherein the hash unit comprises: a router, configured to filter the data to be hashed by using a significant bit of the current alternative hash function so as to obtain the hash result.

8. A method for storing a routing table, comprising:
dividing the routing table into a next-level node pointer portion and a matching entry portion for being stored;
storing root node data and first-level node data at the next-level node pointer portion, wherein the root node data comprises a root node matching entry with a next-level node pointer, a root node hash function of the matching entry, a next-level node pointer of a root node, and a matching entry pointer of the root node; the root node hash function is a formal hash function selected by using the method for selecting a hash function according to claim 1; and the matching entry pointer of the root node points to the matching entry portion; and
hashing an Internet protocol (IP) address in a step length range of a first-level node of the matching entry by using the root node hash function of the matching entry, and storing the first-level node data at a position pointed to by the next-level node pointer of the root node by using a hash result as an offset address, wherein the first-level node data comprises the IP address in the step length range of the first-level node of the matching entry, a hash function of the first-level node of the matching entry, a next-level node pointer of the first-level node and a matching entry pointer of the first-level node; and the hash function of the first-level node is the formal hash function selected by using the method for selecting a hash function according to claim 1; and the matching entry pointer of the first-level node points to the matching entry portion.

9. The method according to claim 8, further comprising:
storing $N^{th}$-level node data at the next-level node pointer portion; and
hashing an IP address in a step length range of an $N^{th}$-level node by using a hash function of an $(N-1)^{th}$-level node of the matching entry, and storing the $N^{th}$-level node data at a position pointed to by the next-level node pointer of the $(N-1)^{th}$-level node by using a hash result as an offset address, wherein the $N^{th}$-level node data comprises the IP address in the step length range of the $N^{th}$-level node of the matching entry, a hash function of the $N^{th}$-level node of the matching entry, a next-level node pointer of the $N^{th}$-level node, and a matching entry pointer of the $N^{th}$-level node; and the hash function of the $N^{th}$-level node is a formal hash function selected by using the method for selecting a hash function according to claim 1; the matching entry pointer of the $N^{th}$-level node points to the matching entry portion; and N is an integer greater than or equal to 2.

10. A method for storing a routing table, comprising:
dividing the routing table into a next-level node pointer portion and a matching entry portion for being stored;
storing root node data and first-level node data at the next-level node pointer portion, wherein the root node data comprises a root node matching entry with a next-level node pointer, a hash function of a root node segment of the matching entry, a next-level node pointer of the root node segment, and a matching entry pointer of a root node; the root node segment is a segment formed by dividing a next-level node of the root node matching entry into more than two segments; the hash function of the root node segment is a formal hash function selected for an Internet protocol (IP) address in a step length range of a first-level node in the root node segment of the matching entry by using the method for selecting a hash function according to claim 1; and the matching entry pointer of the root node points to the matching entry portion; and hashing the IP address in the step length range of the first-level node in the root node segment of the matching entry by using the hash function of the root node segment of the matching entry, and storing the first-level node data in the root node segment at a position pointed to by a next-level node pointer of the root node by using a hash result as an offset address; wherein the first-level node data comprises the IP address in the step length range of the first-level node of the matching entry, a hash function of a first-level node segment of the matching entry, a next-level node pointer of the first-level node segment, and a matching entry pointer of the first-level node; the first-level node segment is a segment formed by dividing a next-level node of the first-level node of the matching entry into more than two segments; and the hash function of the first-level node segment is a formal hash function selected for an IP address in a step length range of a second-level node in the root node segment of the matching entry by using the method for selecting a hash function according to claim 1; and the matching entry pointer of the first-level node points to the matching entry portion.

11. The according to claim 10, further comprising:

storing $N^{th}$-level node data at the next-level node pointer portion; and hashing an IP address in a step length range of an $N^{th}$-level node in an $(N-1)^{th}$-level node segment by using a hash function of the $(N-1)^{th}$-level node segment of the matching entry, and storing the $N^{th}$-level node data in the $(N-1)^{th}$-level node segment at a position pointed to by a next-level node pointer of the $(N-1)^{th}$-level node segment by using a hash result as an offset address;

wherein the $N^{th}$-level node data comprises the IP address in the step length range of the $N^{th}$-level node of the matching entry, a hash function of an $N^{th}$-level node segment of the matching entry, a next-level node pointer of the $N^{th}$-level node segment, and a matching entry pointer of the $N^{th}$-level node; and the hash function of the $N^{th}$-level node segment is a formal hash function selected for an IP address in a step length range of an $(N+1)^{th}$-level node in the root node segment of the matching entry by using the method for selecting a hash function according to claim 1; and the matching entry pointer of the $N^{th}$-level node points to the matching entry portion; and N is an integer greater than or equal to 2.

12. A device for storing a routing table, comprising:

a first matching entry unit, configured to store a matching entry portion of the routing table; and a first next-level node pointer unit, configured to store root node data and first-level node data;

wherein the root node data comprises a root node matching entry with a next-level node pointer, a root node hash function of the matching entry, a next-level node pointer of a root node, and a matching entry pointer of the root node; the root node hash function is a formal hash function selected by using the method for selecting a hash function according to claim 1; and the matching entry pointer of the root node points to the matching entry portion;

an Internet protocol (IP) address in a step length range of a first-level node of the matching entry is hashed by using the root node hash function of the matching entry, and a hash result is taken as an offset address to store the first-level node data at a position pointed to by the next-level node pointer of the root node;

the first-level node data comprises the IP address in the step length range of the first-level node of the matching entry, a hash function of the first-level node of the matching entry, a next-level node pointer of the first-level node, and a matching entry pointer of the first-level node; the hash function of the first-level node is a formal hash function selected by using the method for selecting a hash function according to claim 1; and the matching entry pointer of the first-level node points to the matching entry portion.

13. The device according to claim 12, wherein the first next-level node pointer unit is further configured to:

store $N^{th}$-level node data; and hash an IP address in a step length range of an $N^{th}$-level node by using a hash function of an $(N-1)^{th}$-level node of the matching entry, and store the $N^{th}$-level node data at a position pointed to by the next-level node pointer of the $(N-1)^{th}$-level node by using a hash result as an offset address;

wherein the $N^{th}$-level node data comprises the IP address in the step length range of the $N^{th}$-level node of the matching entry, a hash function of the $N^{th}$-level node of the matching entry, a next-level node pointer of the $N^{th}$-level node, and a matching entry pointer of the $N^{th}$-level node; and the hash function of the $N^{th}$-level node is a formal hash function selected by using the method for selecting a hash function according to claim 1;

the matching entry pointer of the $N^{th}$-level node points to the matching entry portion; and N is an integer greater than or equal to 2.

14. A device for storing a routing table, comprising:

a second matching entry unit, configured to store a matching entry portion of the routing table; and a second next-level node pointer unit, configured to store root node data and first-level node data;

wherein the root node data comprises a root node matching entry with a next-level node pointer, a hash function of a root node segment of the matching entry, a next-level node pointer of the root node segment, and a matching entry pointer of a root node; the root node segment is a segment formed by dividing a next-level node of the root node matching entry into more than two segments; the hash function of the root node segment is a formal hash function selected for an Internet protocol (IP) address in a step length range of a first-level node in the root node segment of the matching entry by using the method for selecting a hash function according to claim 1; and the matching entry pointer of the root node points to the matching entry portion;

the IP address in the step length range of the first-level node in the root node segment of the matching entry is hashed by using the hash function of the root node segment of the matching entry, and the first-level node data of the root node segment at a position pointed to by a next-level node pointer of the root node is stored by using a hash result as an offset address;

the first-level node data comprises the IP address in the step length range of the first-level node of the matching entry, a hash function of a first-level node segment of the matching entry, a next-level node pointer of the first-level node segment, and a matching entry pointer of the first-level node; the first-level node segment is a segment formed by dividing a next-level node of the first-level node of the matching entry into more than two segments; and the hash function of the first-level node segment is a formal hash function selected for an IP address in a step length range of a second-level node in the root node segment of the matching entry by using the method for selecting a hash function according to claim 1; and the matching entry pointer of the first-level node points to the matching entry portion.

15. The device according to claim 14, wherein the second next-level node pointer unit is further configured to:

store $N^{th}$-level node data; and hash an IP address in a step length range of an $N^{th}$-level node in an $(N-1)^{th}$-level node segment by using a hash function of the $(N-1)^{th}$-level node segment of the matching entry, and store the $N^{th}$-level node data of the $(N-1)^{th}$-level node segment at a position pointed to by a next-level node pointer of the $(N-1)^{th}$-level node segment by using a hash result as an offset address;

the $N^{th}$-level node data comprises the IP address in the step length range of the $N^{th}$-level node of the matching entry, a hash function of an $N^{th}$-level node segment of the matching entry, a next-level node pointer of the $N^{th}$-level node segment, and a matching entry pointer of the $N^{th}$-level node; and the hash function of the $N^{th}$-level node segment is a formal hash function selected for an IP address in a step length range of a $(N+1)^{th}$-level node in the root node segment of the matching entry by using the method for selecting a hash function according to claim 1;

the matching entry pointer of the $N^{th}$-level node points to the matching entry portion; and N is an integer greater than or equal to 2.

16. A method for selecting a hash function, comprising:

receiving a plurality of data to be hashed;

hashing a first of the plurality of data using a current hashing function and generating a first hash result;

if the first hash result has a carry, replace the current hasing function with a next hash function and repeating the hashing the first of the plurality of data using the next hash function;

repeating the hashing step until there is no carry;

selecting the respective hash function when the no carry occurs as a formal hash function; and repeating starting from the hashing step using a next of the plurality of data until the plurality of data is depleted.

* * * * *